(12) United States Patent
Mahure et al.

(10) Patent No.: US 12,509,338 B2
(45) Date of Patent: Dec. 30, 2025

(54) AUXILIARY ROLLERS FOR A FORK OF A FORKED MATERIALS-HANDLING VEHICLE

(71) Applicant: Hyster-Yale Group, Inc., Fairview, OR (US)

(72) Inventors: Prafulla Y. Mahure, Pune (IN); Andrea Cavazzin, Milan (IT); ShengFei Pang, Shanghai (CN)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/618,358

(22) Filed: Mar. 27, 2024

(65) Prior Publication Data

US 2025/0304414 A1    Oct. 2, 2025

(51) Int. Cl.
*B66F 9/24* (2006.01)
*B66F 9/12* (2006.01)

(52) U.S. Cl.
CPC ..................... *B66F 9/12* (2013.01)

(58) Field of Classification Search
CPC .............. B62B 2203/20; B66F 9/12
See application file for complete search history.

(56) References Cited

U.S. PATENT DOCUMENTS 2,178,647 A    11/1939    Raymond et al.
2,274,164 A    2/1942    Quayle
2,686,036 A *  8/1954    Quayle ................. B62B 3/0612
                                            254/10 C (Continued)

FOREIGN PATENT DOCUMENTS

CA    2216472 A1    10/1996
DE    202018005790 U1    4/2019

(Continued)

OTHER PUBLICATIONS

European Extended Search Report, EPO Pat. Appl. 24188943 (Dec. 10, 2024).
Examination report No. 1, Australian Patent Appl. No. 2024204830 (Sep. 17, 2025).
Richmond Rolling Solutions, Double Length 2400mm 1500kg Powder Coated Pallet Jack (PRJ014), https://www.richmondau.com/product/double-pallet-jack-2400mm-long-pjr014 (Mar. 25, 2019).

*Primary Examiner* — Michael A Riegelman

(57) ABSTRACT

A fork assembly for a forked materials-handling vehicle with a chassis is configured to simultaneously lift at least two inline pallets, each pallet comprising a plurality of bottom boards. The fork assembly comprises a plurality of elongated forks and a plurality of auxiliary rollers. The plurality of elongated forks includes a first fork and a second fork, where each fork has a proximal end and a distal end along a longitudinal axis and the proximal end of each fork is attached to the chassis. Each fork includes a load wheel connected to the fork, and each fork has a length sufficient to lift at least two pallets arranged in an inline configuration. The plurality of auxiliary rollers are rotatably coupled to one or more of the plurality of forks, where the plurality of auxiliary rollers are positioned longitudinally along the length of the fork assembly such that at least one of the auxiliary rollers is on at least one bottom board of a proximal pallet of the at least two pallets when the load wheel has entered the proximal pallet and contacts a bottom board of the at least two pallets.

22 Claims, 32 Drawing Sheets

(56) References Cited

U.S. PATENT DOCUMENTS

| | | | | |
|---|---|---|---|---|
| 5,752,584 | A * | 5/1998 | Magoto | B62B 3/06 |
| | | | | 187/233 |
| 9,714,047 | B1 * | 7/2017 | Shunli | B62B 3/001 |
| 9,718,661 | B1 * | 8/2017 | Hoffman | B62B 5/0076 |
| 2005/0036880 | A1 | 2/2005 | Magoto et al. | |
| 2015/0014948 | A1 * | 1/2015 | Keen | B62B 3/008 |
| | | | | 280/43.12 |
| 2018/0009643 | A1 * | 1/2018 | Hoffman | B66F 9/24 |
| 2018/0251145 | A1 * | 9/2018 | Dunigan | B62B 3/06 |
| 2022/0048550 | A1 * | 2/2022 | Popovits | B62B 3/0606 |
| 2022/0315087 | A1 * | 10/2022 | White | B62B 3/0637 |
| 2025/0051151 | A1 * | 2/2025 | Rossi | B66F 9/122 |
| 2025/0083933 | A1 * | 3/2025 | Schüler | B66F 9/12 |

FOREIGN PATENT DOCUMENTS

| | | | |
|---|---|---|---|
| EP | 3251918 | A1 | 12/2017 |
| EP | 3266673 | A1 | 1/2018 |
| EP | 3967570 | A1 | 3/2022 |
| GB | 697794 | A | 9/1953 |
| GB | 832315 | A | 4/1960 |
| GB | 1186329 | | 4/1970 |
| GB | 2123787 | A | 2/1984 |
| GB | 2137161 | A | 10/1984 |
| NL | 2027243 | B1 | 1/2022 |

* cited by examiner

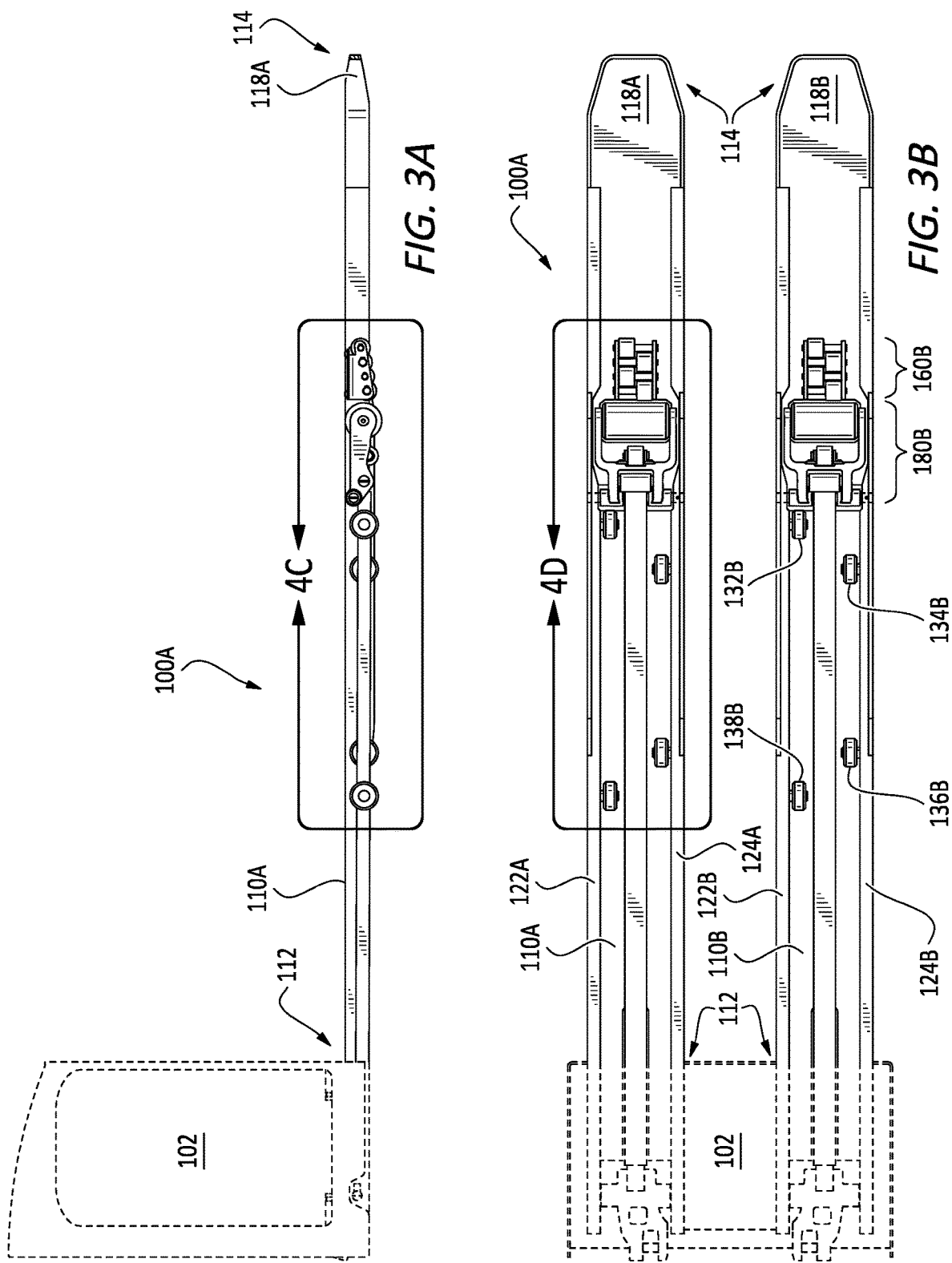

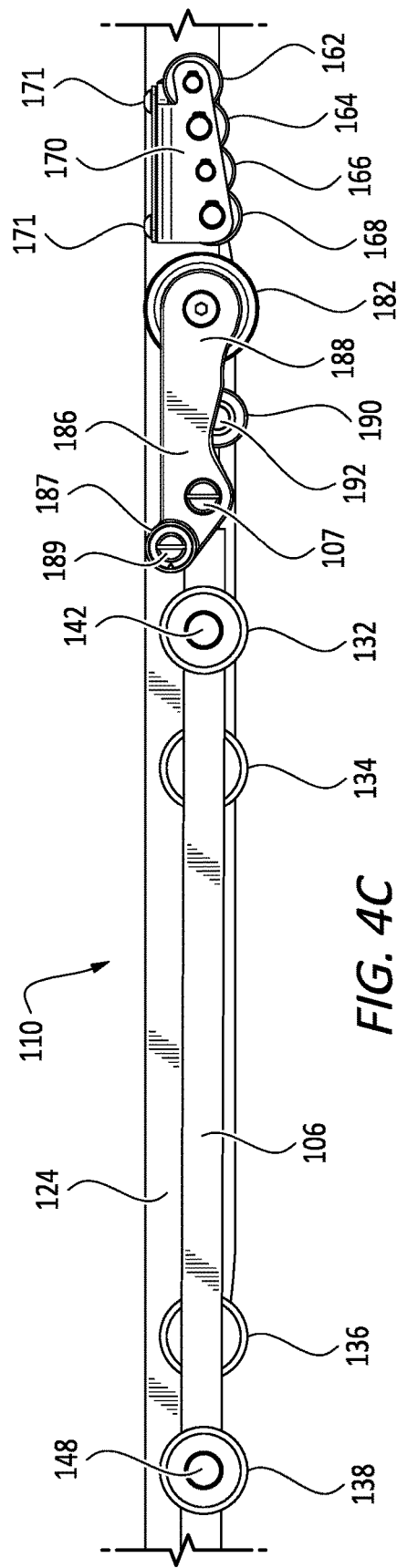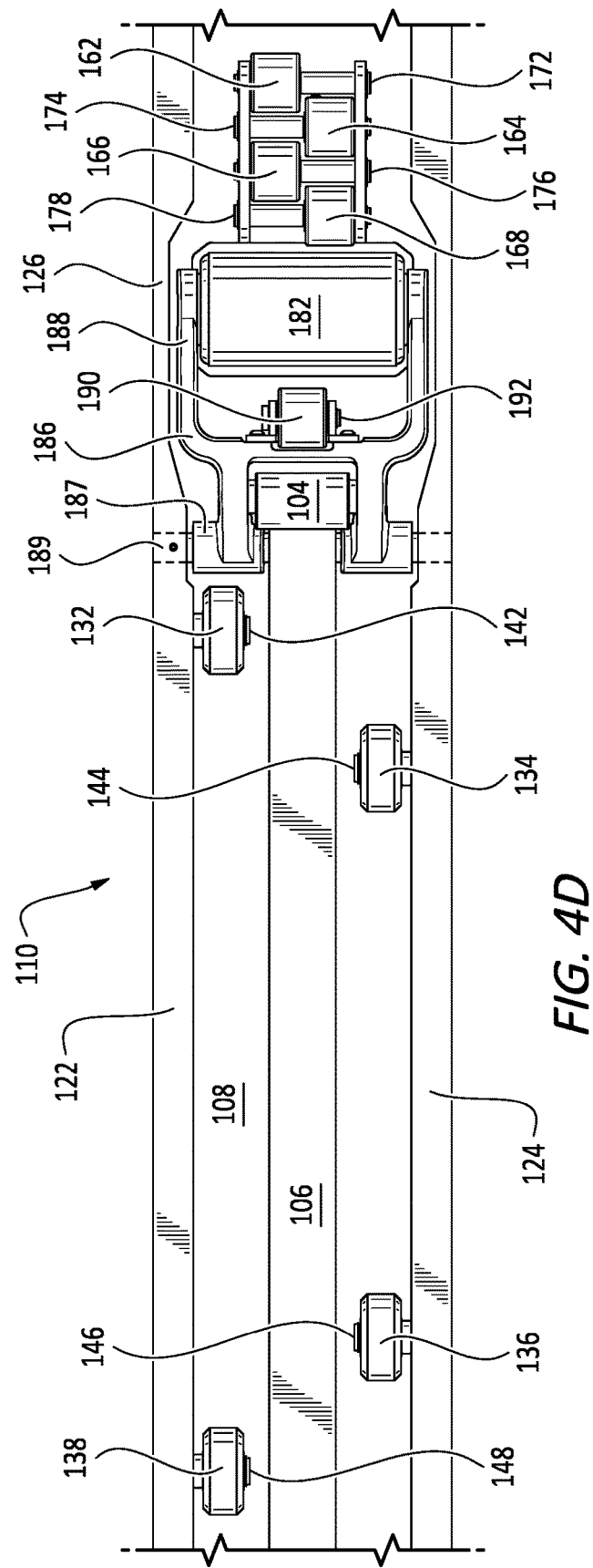
FIG. 4C
FIG. 4D

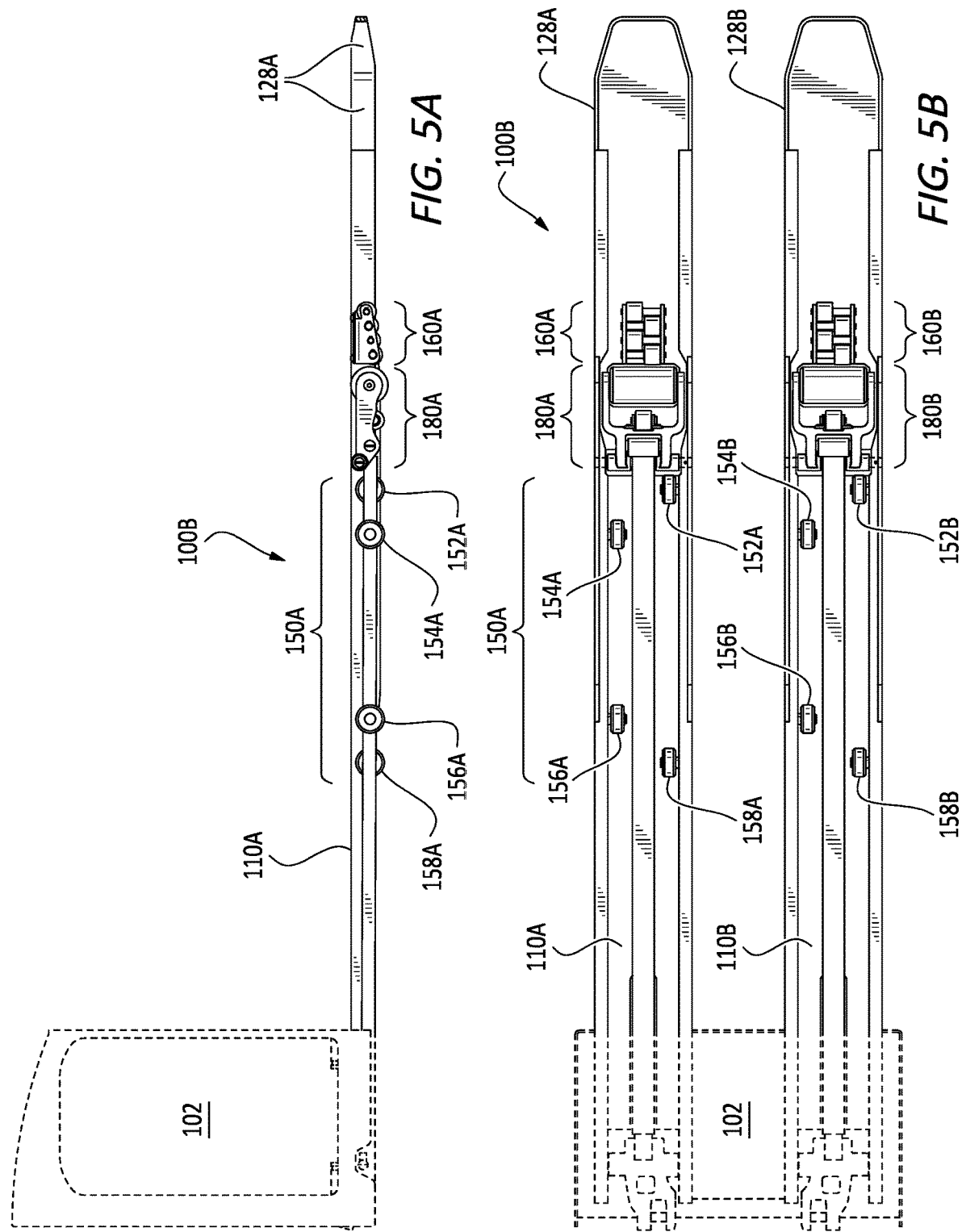

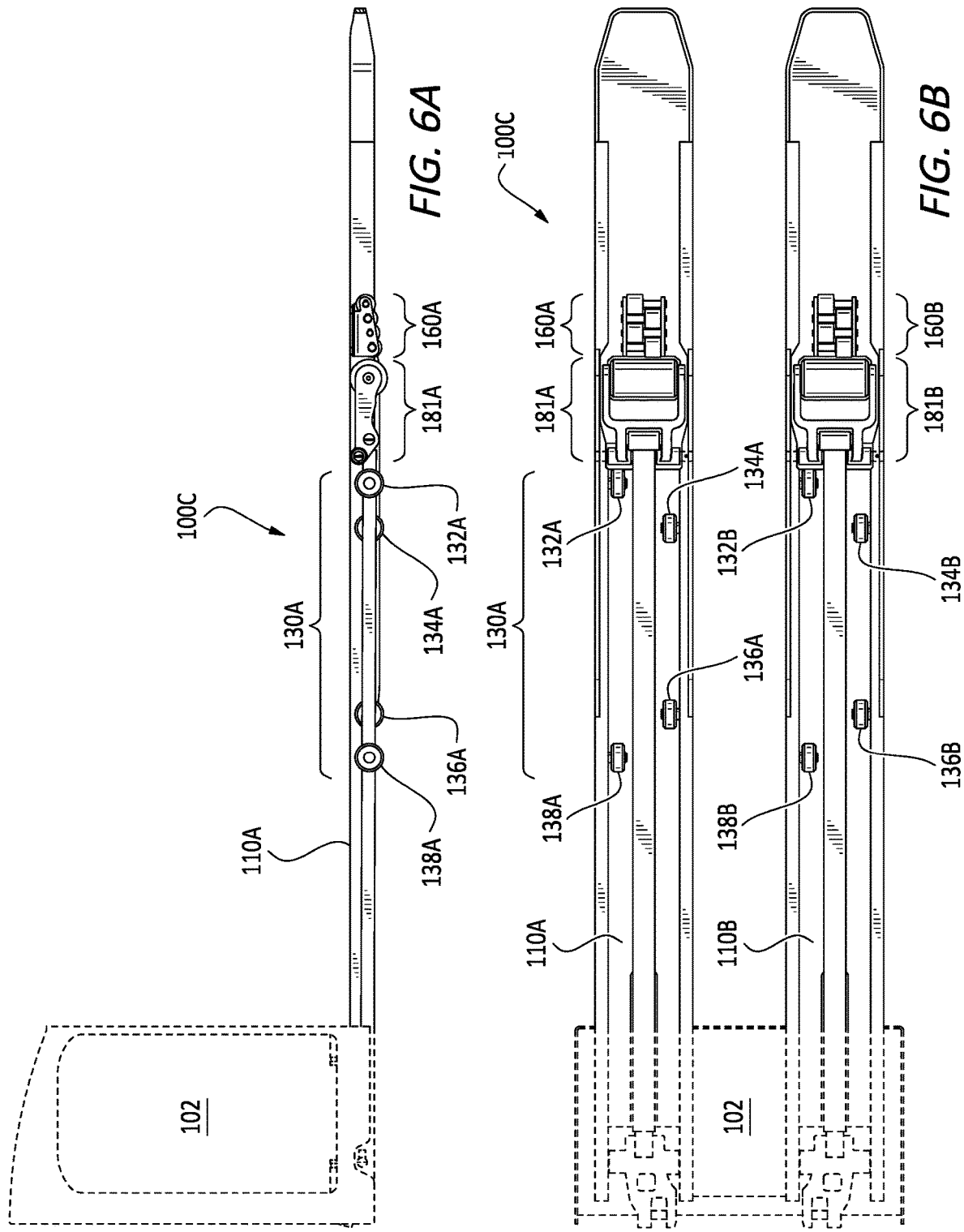

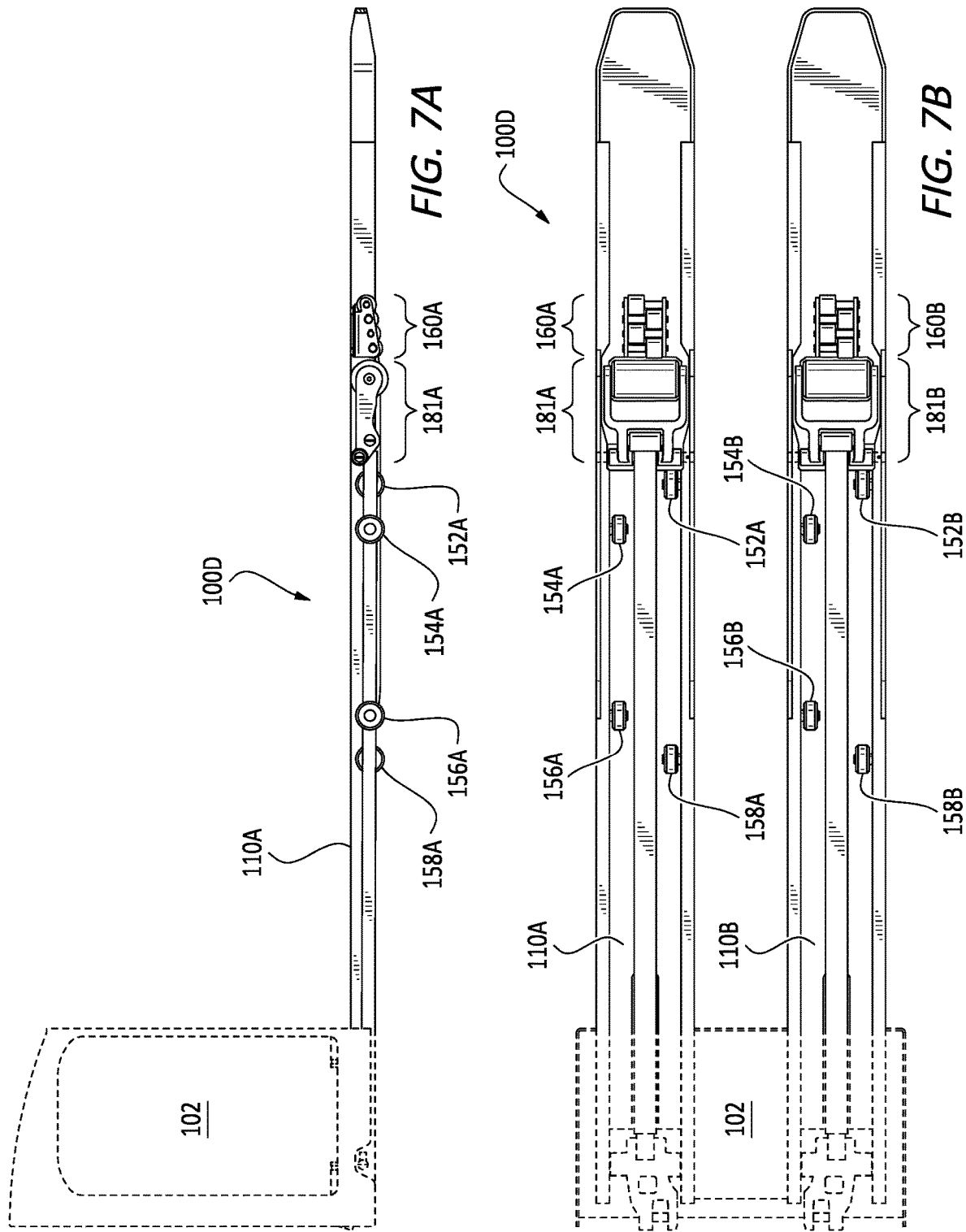

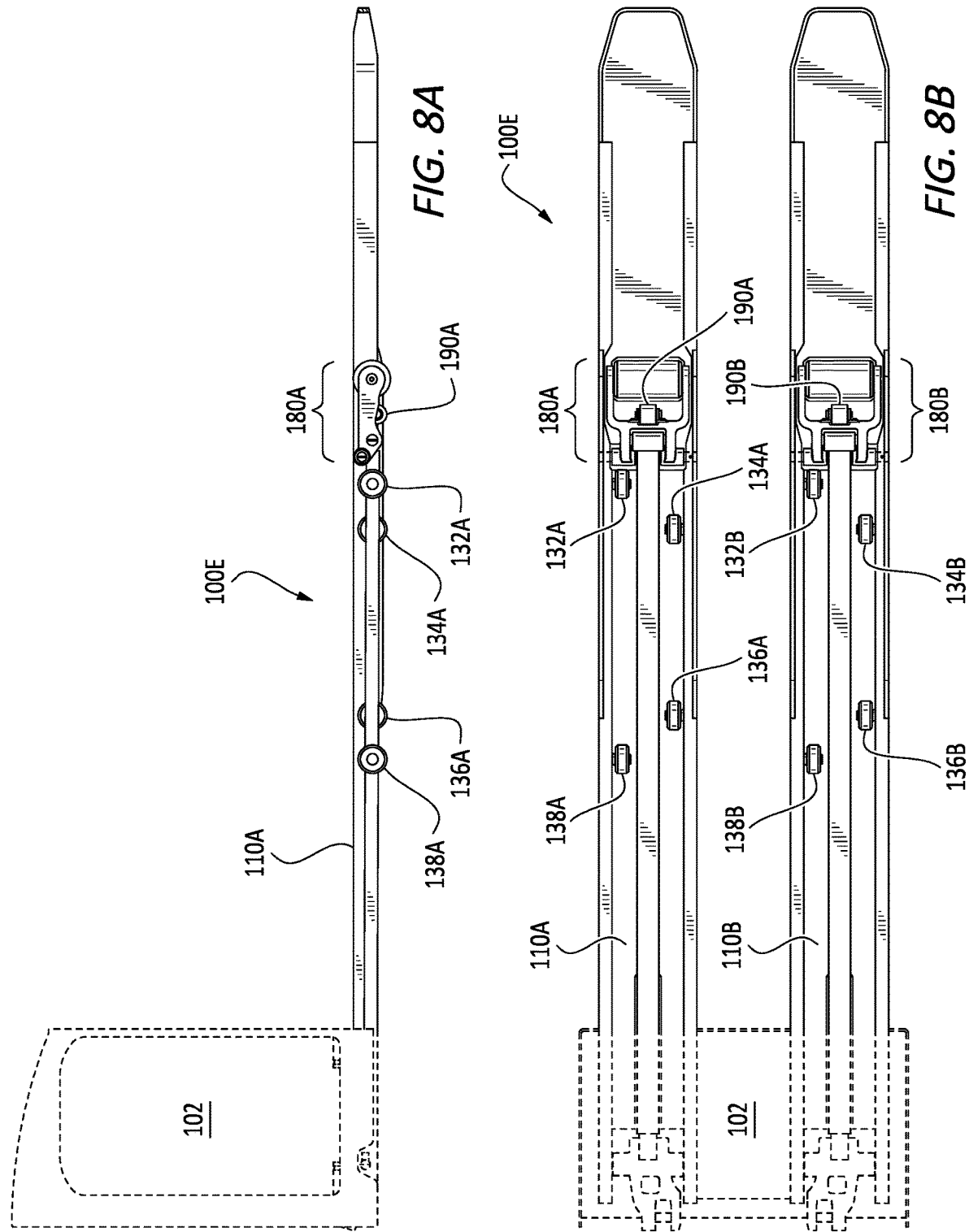

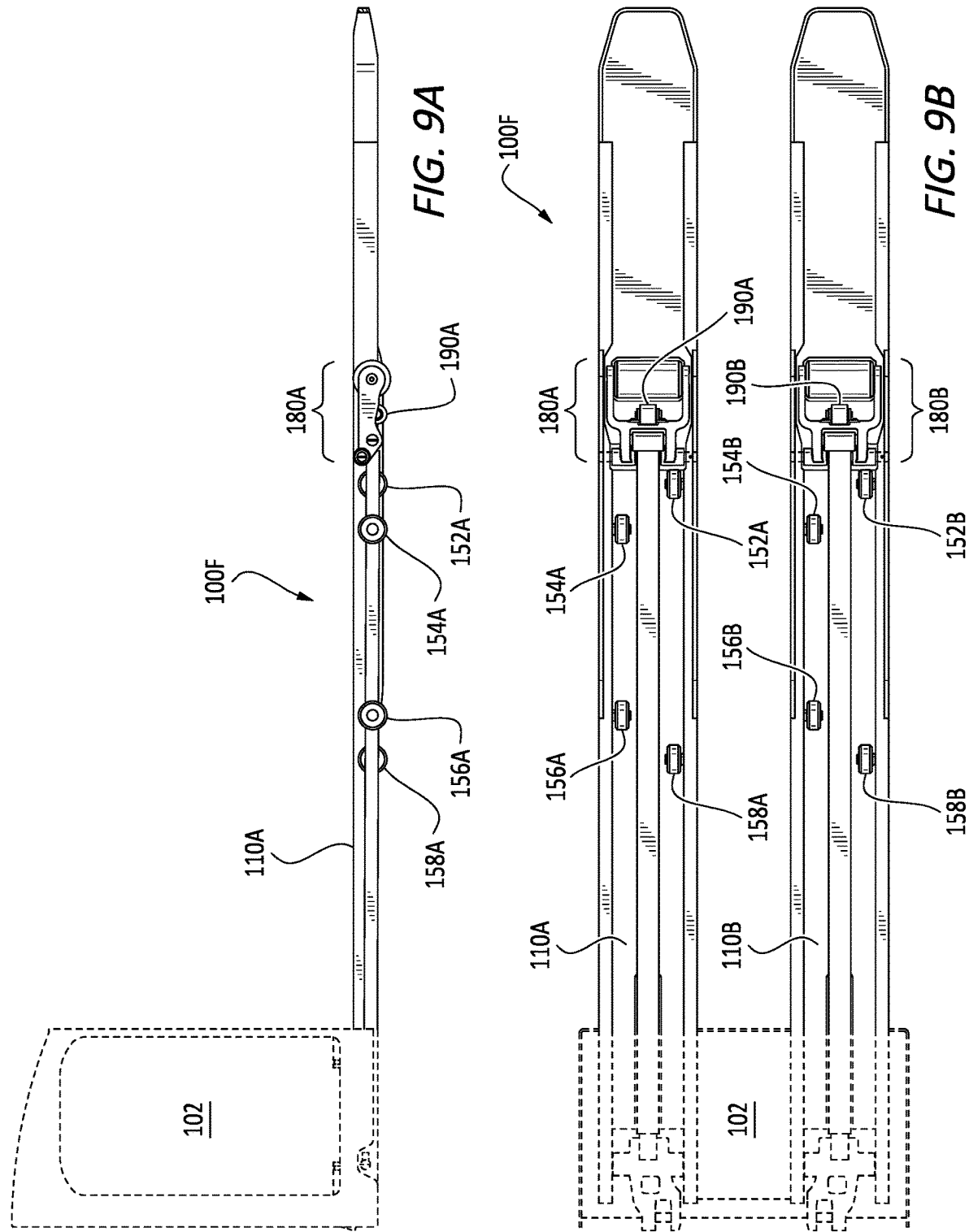

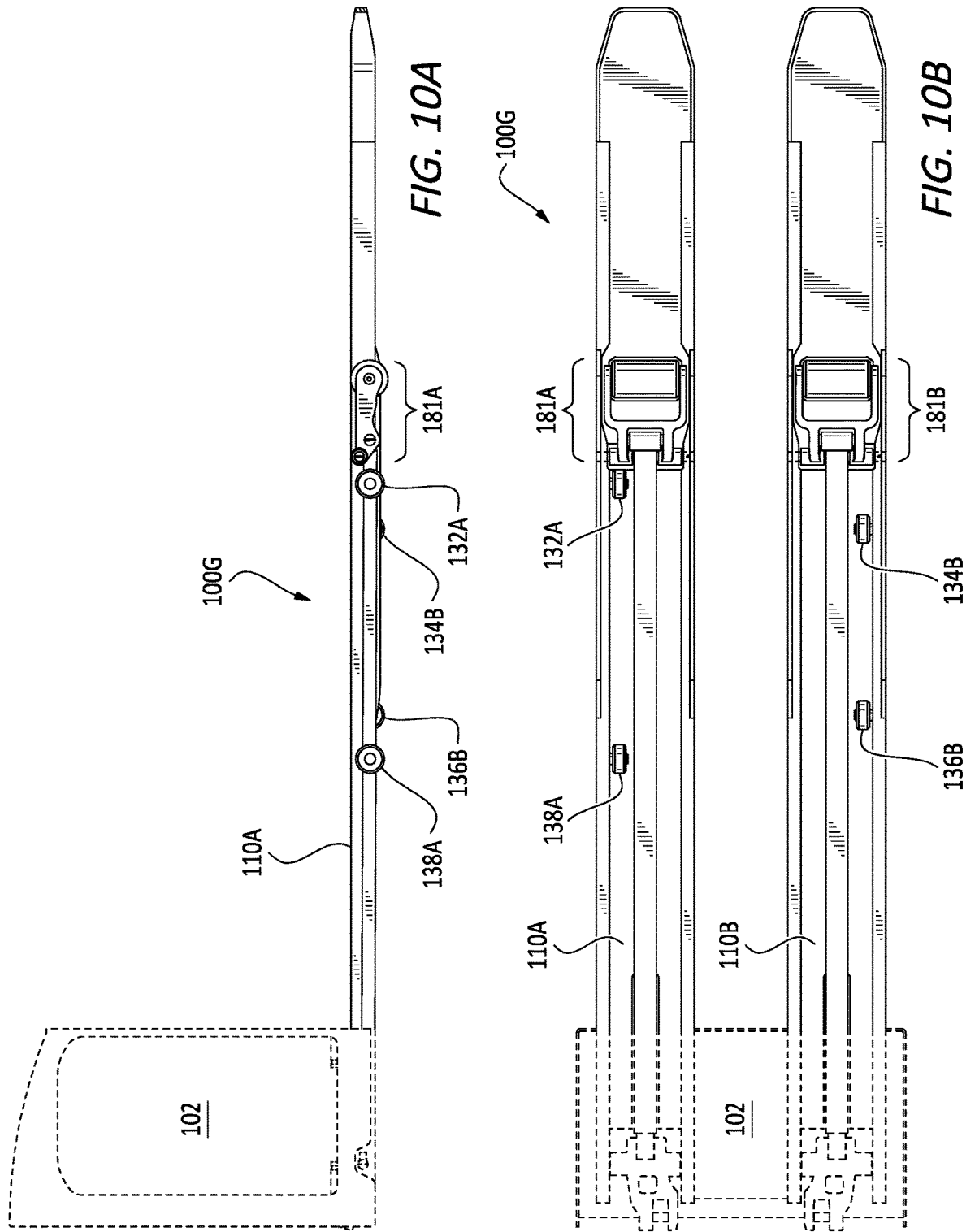

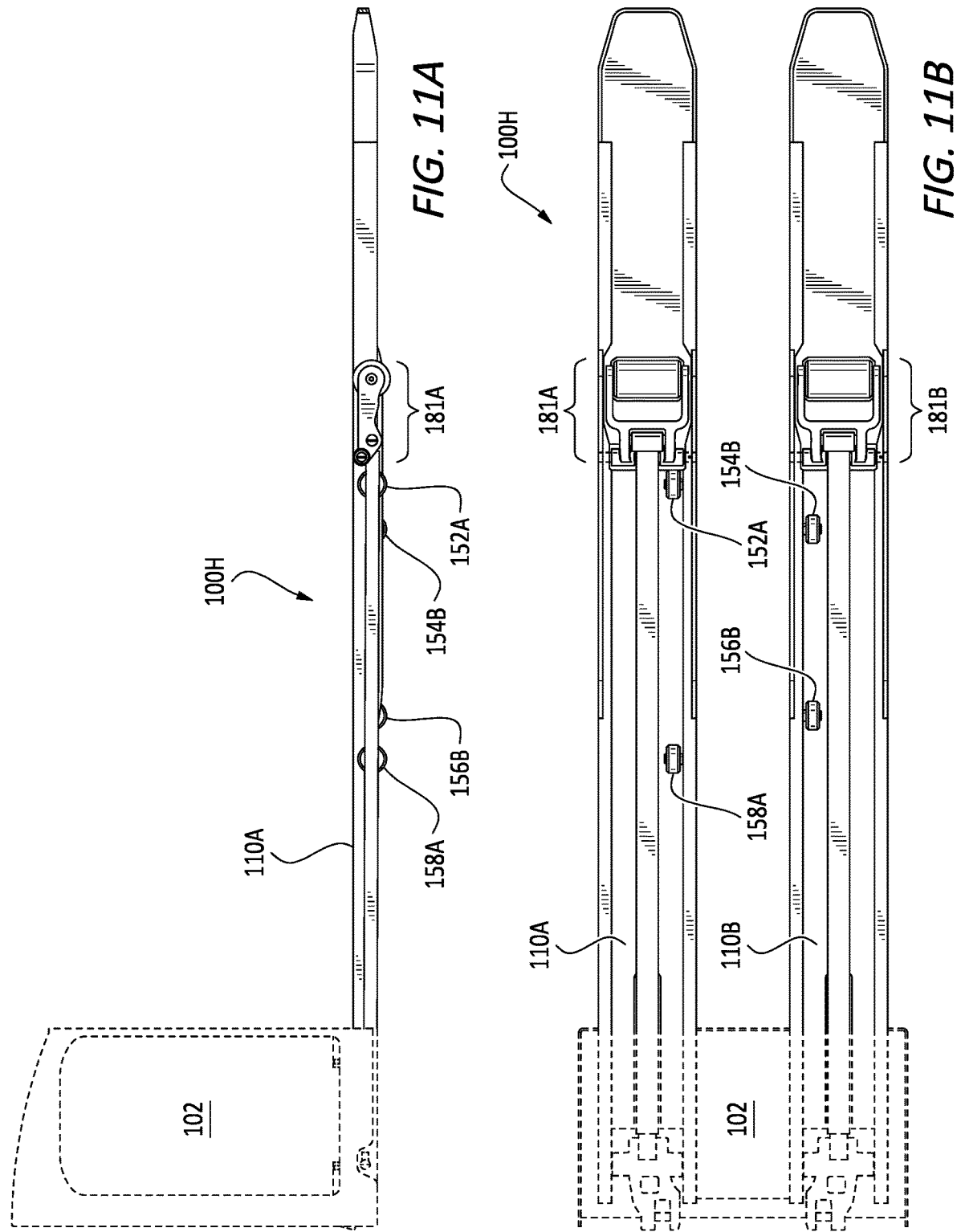

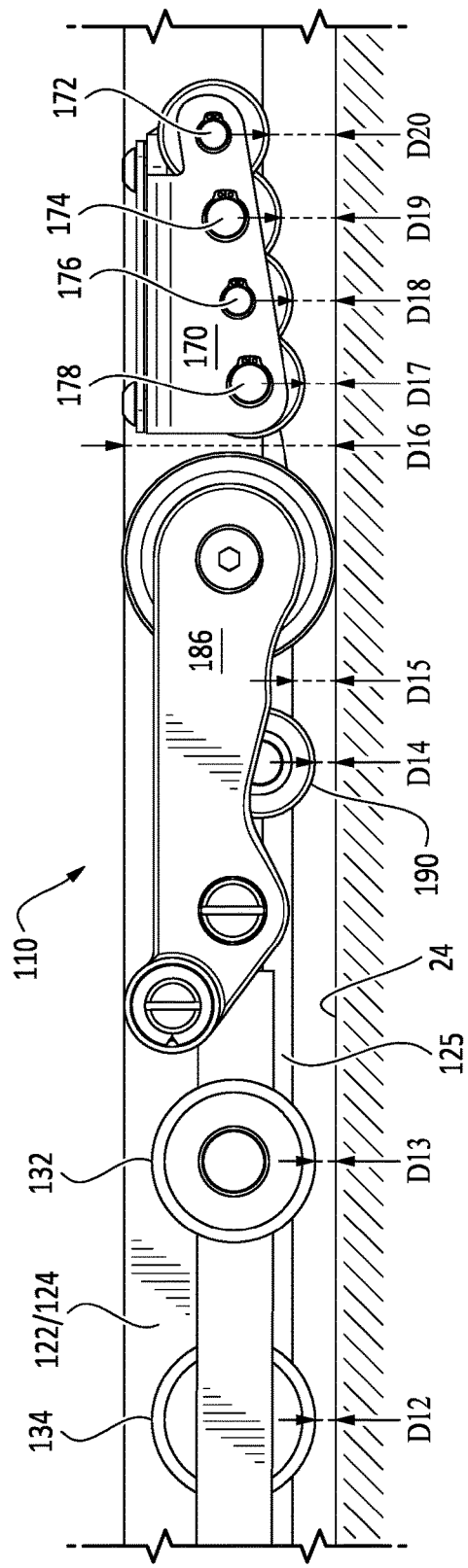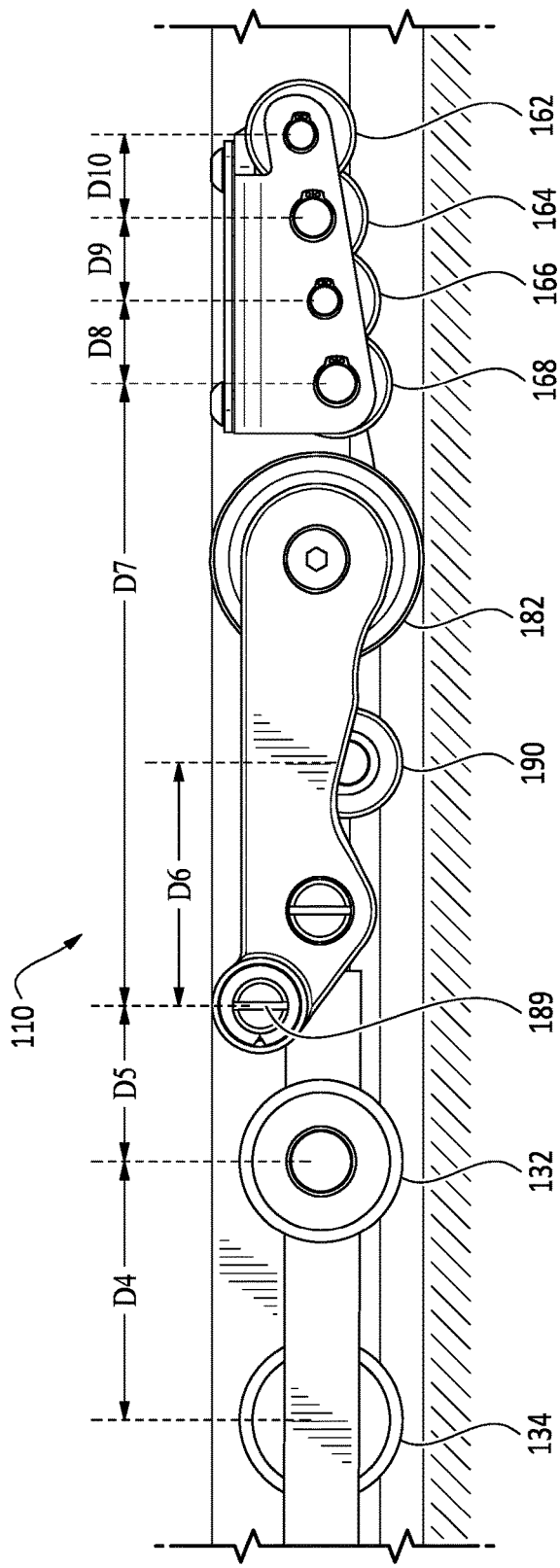
FIG. 14B
FIG. 14C

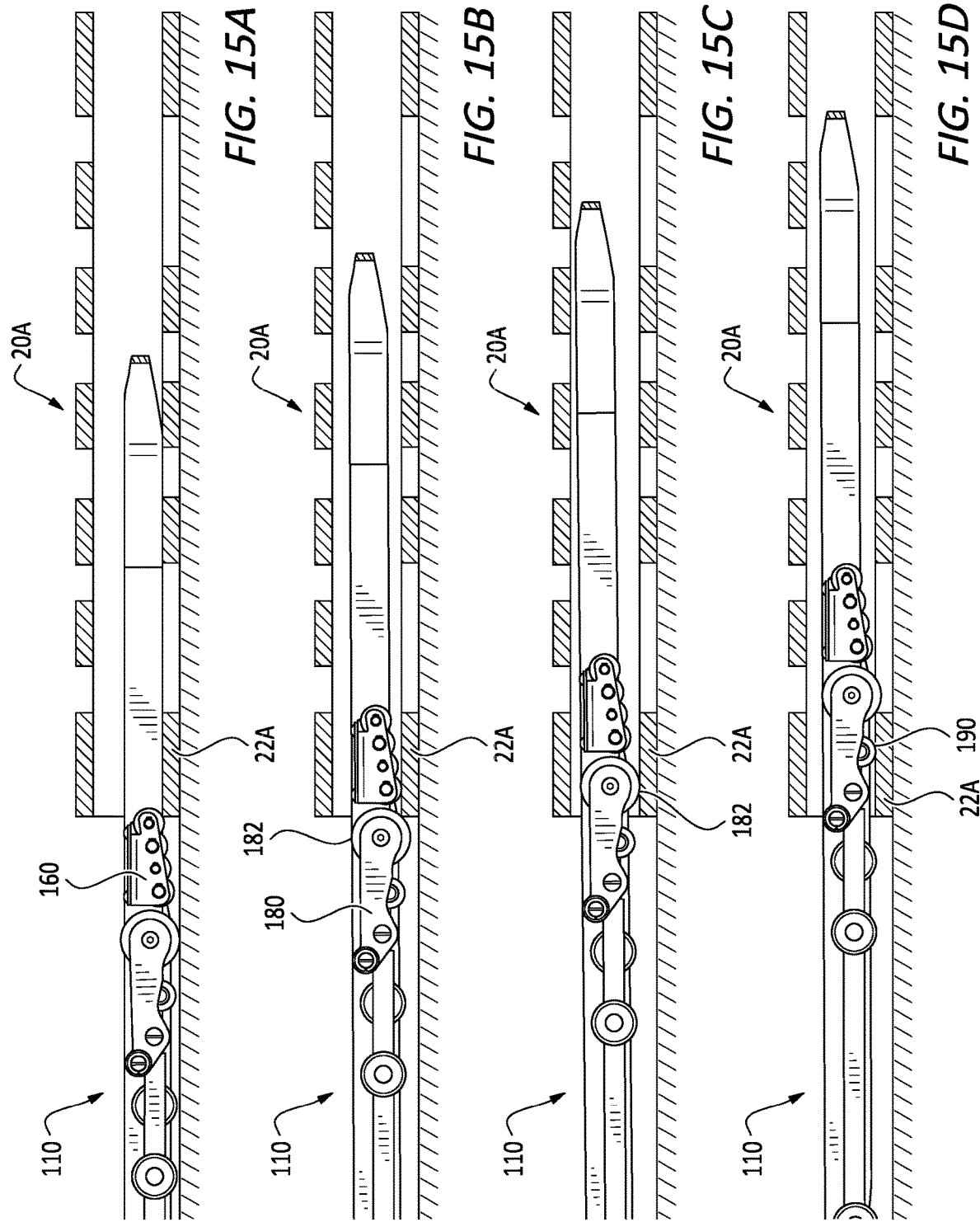

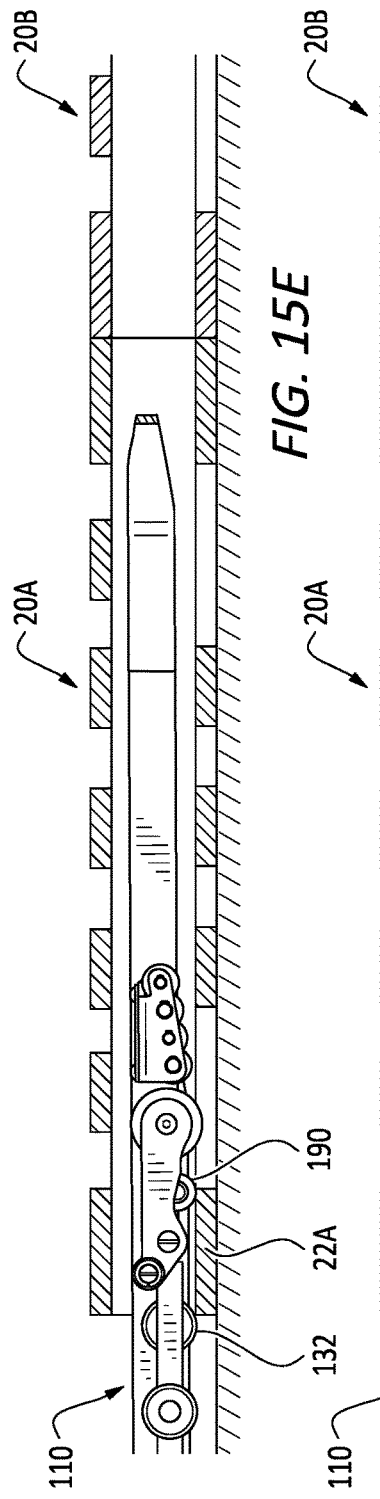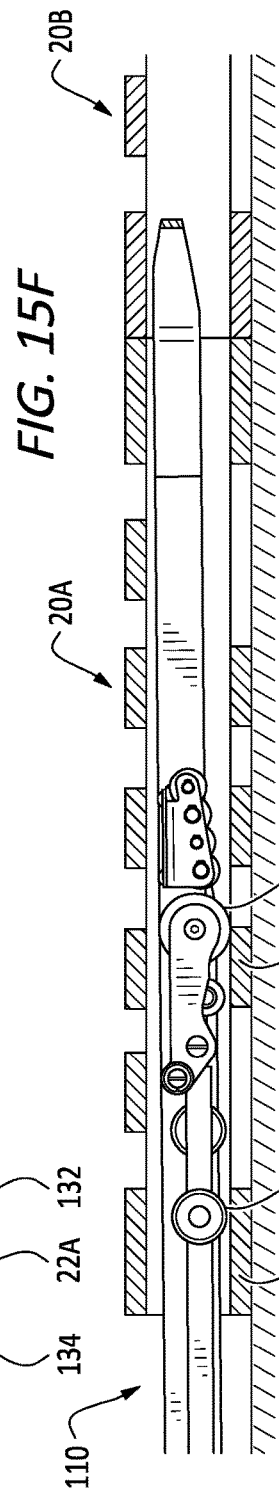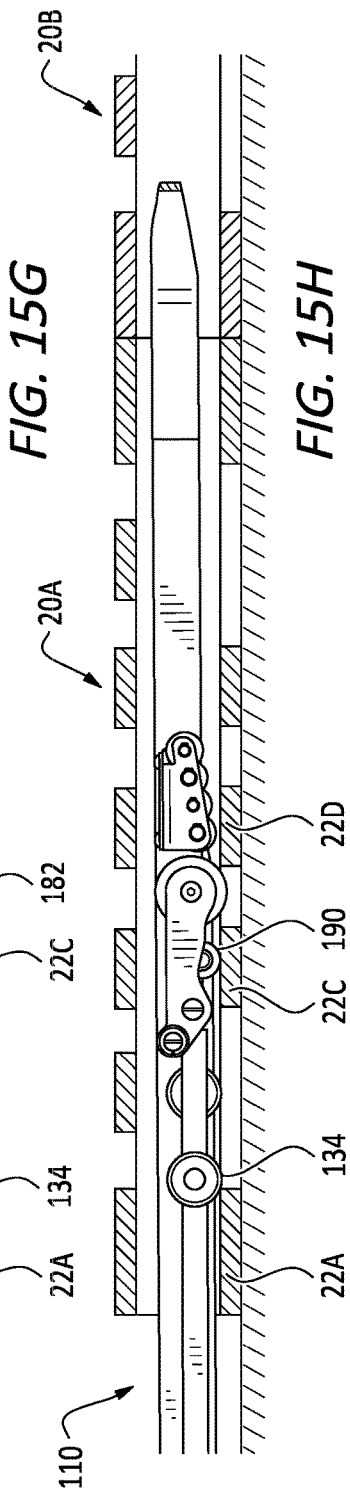

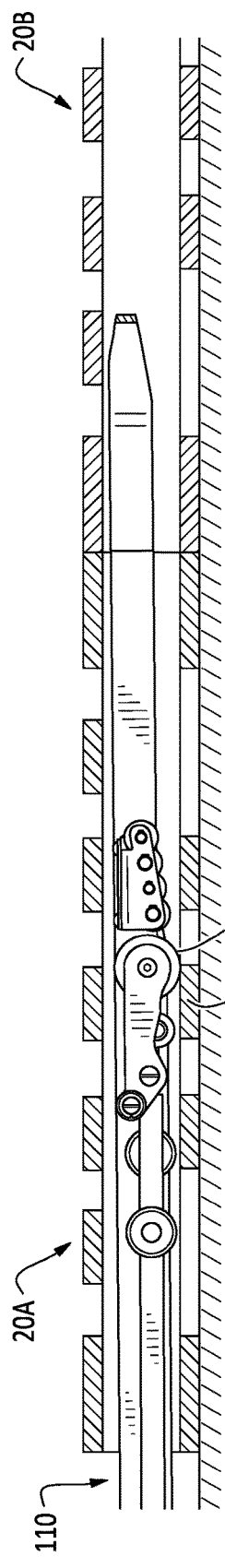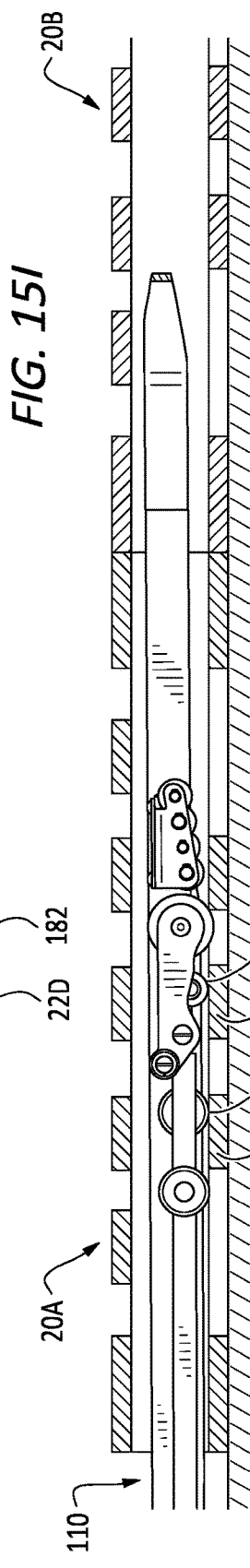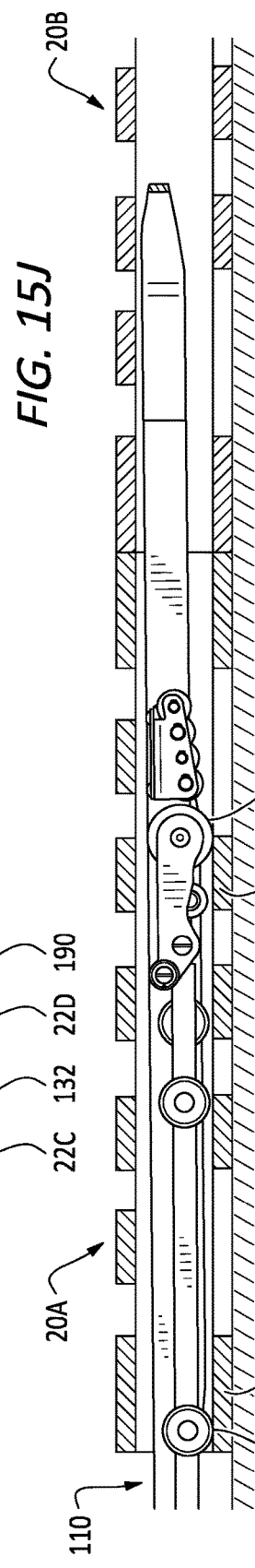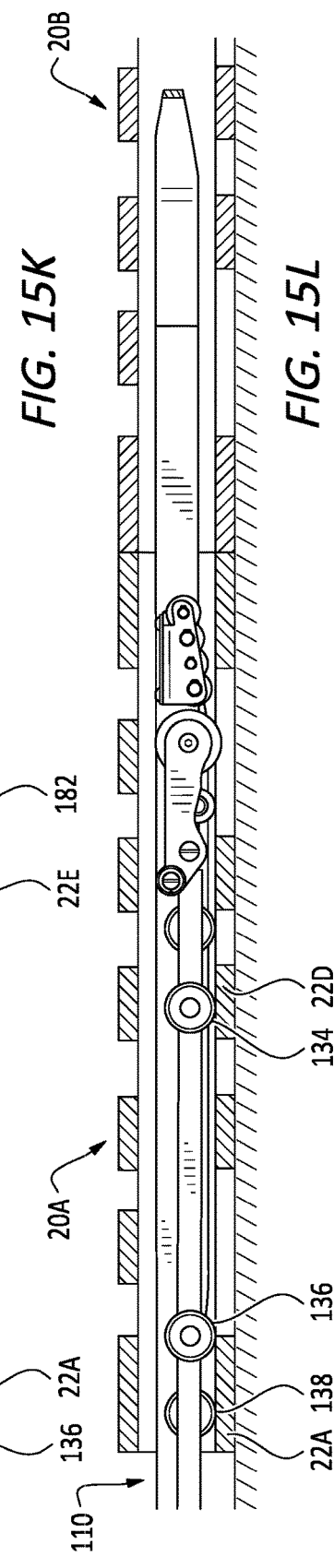

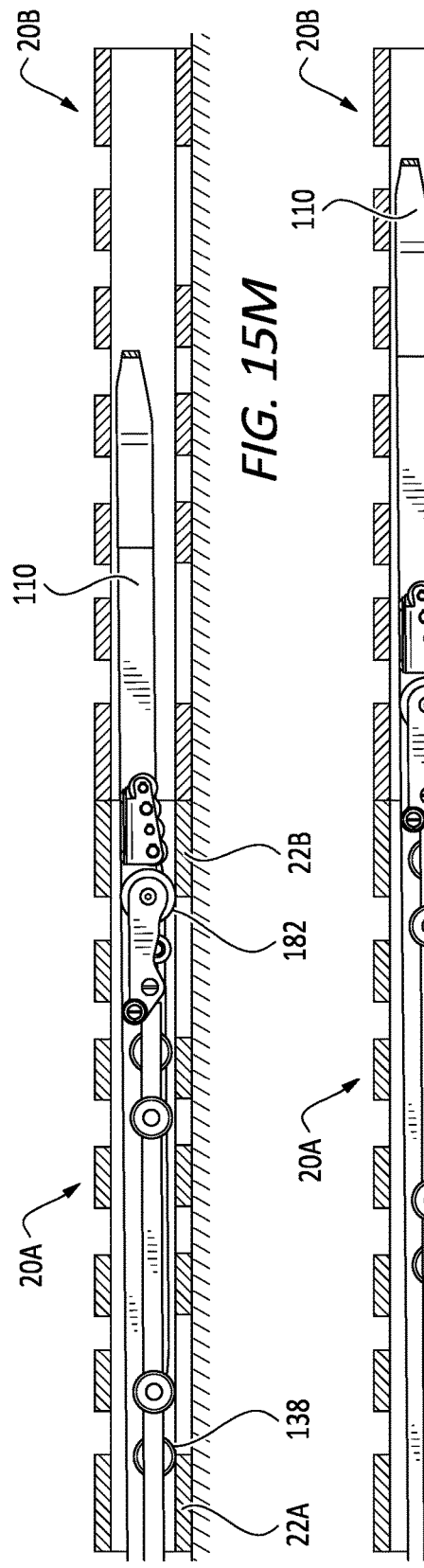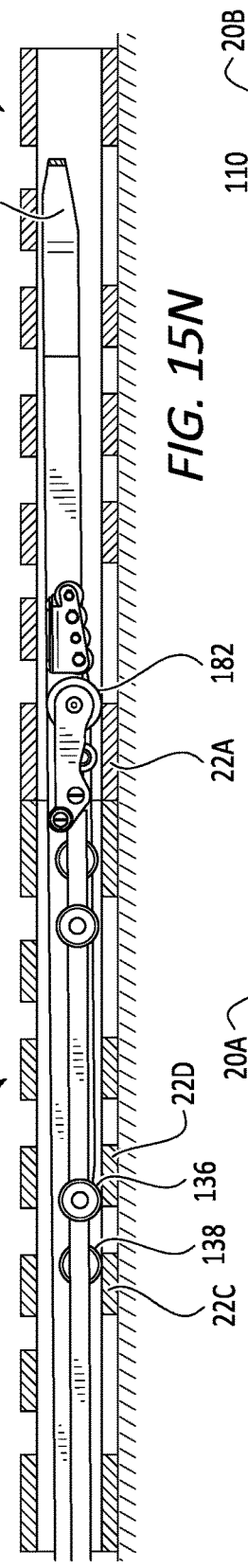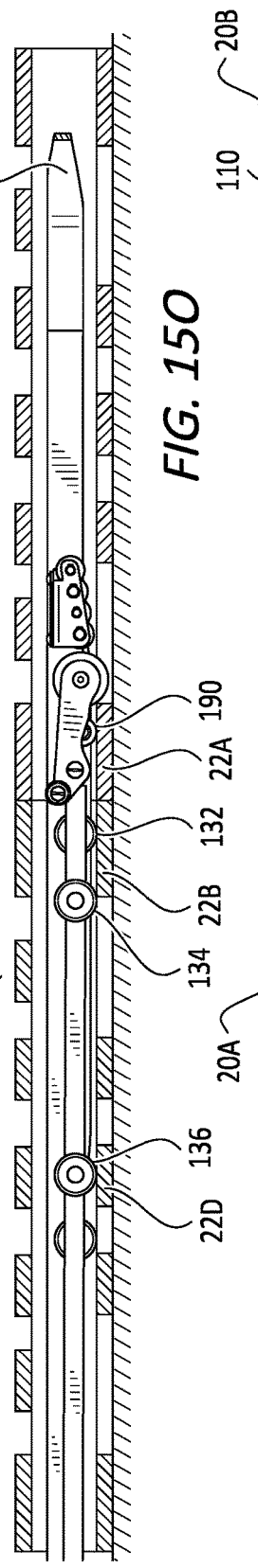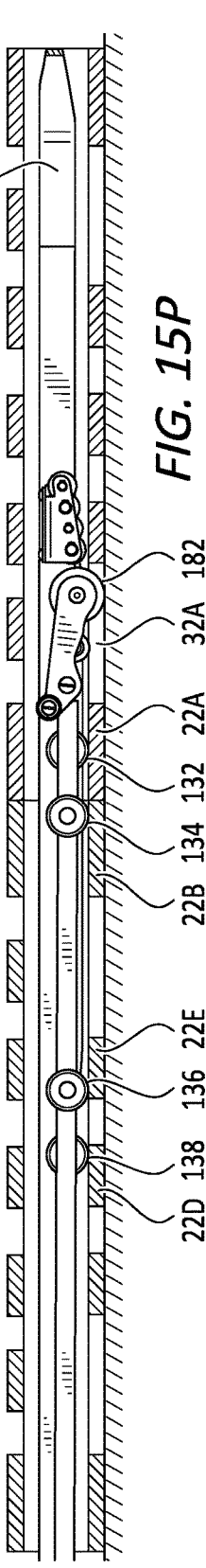

AUXILIARY ROLLERS FOR A FORK OF A FORKED MATERIALS-HANDLING VEHICLE

TECHNICAL FIELD

The field of this disclosure relates generally to forked materials-handling vehicles, such as pallet trucks. More specifically, this disclosure relates to auxiliary rollers on elongated forks suitable for inserting and removing elongated forks into and from a single pallet or multiple in-line pallets.

BACKGROUND INFORMATION

Materials-handling vehicles include class III trucks, such as forked vehicles, and are presented herein only by way of example to pallet trucks. Typical pallet trucks support one, two in-line, or three in-line standard size pallets. Typically, pallet trucks include lifting load forks that are connected at their rear end or heel end to a chassis. The chassis may also support other components, such as power systems, control or steering systems, or user platforms. The front end of each fork typically includes one or more support rollers, commonly called load wheels. Conventionally, a hydraulic or electric system, which is located in proximity to the chassis, operates a lifting mechanism that moves the load wheels and lifts the forks together with goods, such as pallets loaded thereon, in a relatively level or parallel orientation with a floor. In a hydraulic system, the load wheels are typically coupled to the lift mechanism by a mechanical linkage that transmits force from a hydraulic lifting cylinder to the load wheels. Typically, the forks and load thereon are raised only enough for the load (e.g., the bottom of a pallet) to clear the floor sufficiently to move without dragging on the floor. A valve arrangement is provided to relieve the hydraulic pressure in the lifting cylinder, thus lowering and placing the load on the floor.

A steering mechanism, such as a tiller, also may be provided to steer one or more steer wheels relative to the chassis and forks. Controls to activate the lifting mechanism are typically located on or near the tiller handle. A pallet truck may provide power to one or more of its wheels to aid transport of its load, especially up inclines.

Current materials-handling trucks have a low success rate of entering or exiting an empty or lightly-loaded (25 kilograms (kg) or less) closed-bottom pallet. More often than not, the front load wheel strikes against the bottom board, causing the pallet to be pushed along the ground/floor rather than having the forks enter the pallet as intended. Such shunting or pushing the pallet along the ground/floor is undesirable because the horizontal surface on which the pallet sits can be damaged and/or the bottom board of the pallet can be damaged, reducing the pallet's useful life. The success rate appears to depend on several factors such as driver skill, pallet weight, pallet condition, friction between ground/floor and pallet, and the size and shape of the pallet's bottom boards, which are typically not slanted, beveled, or chamfered on the side or along the top corner edges to facilitate rolling over by the wheels. Also, failure to enter the pallet prevents the pallet from being retrieved. Moreover, failure to exit an empty pallet results in the pallet being trapped on the forks, rendering the truck useless until the pallet is removed, or placement of the empty pallet in a position different from the intended location. Operational efficiency is reduced and operator frustration may be increased by these issues.

OVERVIEW OF DISCLOSURE

This disclosure generally relates to (1) auxiliary rollers or wheels on elongate forks of a pallet truck to reduce the movement of empty or unloaded pallets while inserting and removing elongated forks into and from a single pallet or multiple in-line pallets, (2) a design of elongated forks and auxiliary rollers, and (3) a method for inserting or removing elongate forks with auxiliary rollers into and from a single pallet or multiple in-line pallets.

In one embodiment, a fork assembly for a forked materials-handling vehicle with a chassis, such as a pallet truck, is configured to simultaneously lift at least two inline pallets, each pallet comprising a plurality of bottom boards. The fork assembly comprises a plurality of elongated forks and a plurality of auxiliary rollers. The plurality of elongated forks includes a first fork and a second fork, where each fork has a proximal end and a distal end along a longitudinal axis and the proximal end of each fork is attached to the chassis. Each fork includes a load wheel connected to the fork, and each fork has a length sufficient to lift at least two pallets arranged in an inline configuration. The plurality of auxiliary rollers are rotatably coupled to one or more of the plurality of forks, where the plurality of auxiliary rollers are positioned longitudinally along the length of the fork assembly such that at least one of the auxiliary rollers is on at least one bottom board of a proximal pallet of the at least two pallets when the load wheel has entered the proximal pallet and contacts a bottom board of the at least two pallets.

In some additional, alternative, or selectively cumulative embodiments, at least one of the auxiliary rollers is on at least one bottom board of each of the at least two pallets when the load wheel has entered a distal pallet of the at least two pallets and contacts a bottom board of the distal pallet.

In some additional, alternative, or selectively cumulative embodiments, each fork further comprises at least two auxiliary rollers rotatably coupled to side walls of the fork and positioned between the load wheel and the chassis. The two auxiliary rollers rotatably coupled to a first side wall of one of the plurality of forks are closer together than another two auxiliary rollers rotatably coupled to a second side wall of one of the plurality of forks.

In some additional, alternative, or selectively cumulative embodiments, each fork further comprises four auxiliary rollers positioned between the load wheel and the chassis, and two auxiliary rollers rotatably coupled to a first side wall of the fork are closer together than another two auxiliary rollers rotatably coupled to a second side wall of the fork.

In some additional, alternative, or selectively cumulative embodiments, each fork further comprises a pull rod or a push rod positioned between the auxiliary rollers rotatably coupled to the first side wall of the fork and the auxiliary rollers rotatably coupled to the second side wall of the fork, and a movement of the pull rod or push rod raises the fork away from or lowers the fork into the load wheel.

In some additional, alternative, or selectively cumulative embodiments, each fork further comprises eight auxiliary rollers positioned between the load wheel and the chassis, and four auxiliary rollers are rotatably coupled to a first side wall of the fork and four auxiliary rollers are rotatably coupled to a second side wall of the fork.

In some additional, alternative, or selectively cumulative embodiments, each auxiliary roller rotates on a separate auxiliary roller axle.

In some additional, alternative, or selectively cumulative embodiments, each fork further comprises an entry roller assembly with four entry rollers operatively connected between the load wheel and the distal end, and with each entry roller from the load wheel towards the distal end, the entry rollers incline with an increasing distance from a supporting surface. Optionally, a lead entry roller of the four entry rollers of the entry roller assembly is positioned at least a pallet bottom board width higher than the bottom of the load wheel. Optionally, the four entry rollers of the entry roller assembly are supported by an entry roller bracket connected to the fork. Optionally, each of four entry rollers rotates on an entry roller axle and a width of at least one of four entry rollers is less than half the length of its entry roller axle. Optionally, circular areas of at least two of four entry rollers overlap each other along a transverse axis of the fork.

In some additional, alternative, or selectively cumulative embodiments, a length of each fork is at least 2000 millimeters (mm) from the chassis.

In some additional, alternative, or selectively cumulative embodiments, a bottom of at least one of the auxiliary rollers of each fork is positioned less than a pallet bottom board width higher than the load wheel in a retracted position.

In some additional, alternative, or selectively cumulative embodiments, the load wheel assembly includes a load wheel bracket rotatably coupled with the fork configured to lift and lower the fork from a supporting surface via the load wheel, and the load wheel is rotatably coupled with the load wheel bracket. Optionally, the load wheel bracket supports a load wheel auxiliary roller rotatably coupled with the load wheel bracket. Optionally, a bottom of the load wheel auxiliary roller is positioned less than a pallet bottom board width higher than the load wheel.

In another embodiment, a forked materials-handling vehicle comprises a chassis, a plurality of elongated forks, and a plurality of auxiliary rollers. The plurality of elongated forks includes a first fork and a second fork, and each fork has a proximal end and a distal end along a longitudinal axis, where the proximal end of each fork is attached to the chassis. Each fork includes a load wheel connected to the fork, and each fork has a length sufficient to lift at least two pallets arranged in an inline configuration. The plurality of auxiliary rollers are rotatably coupled to one or more of the plurality of elongated forks. The plurality of auxiliary rollers are positioned longitudinally along the length of the fork assembly such that at least one of the auxiliary rollers is on at least one bottom board of a proximal pallet of the at least two pallets when the load wheel has entered the proximal pallet and contacts a bottom board of the at least two pallets.

In some additional, alternative, or selectively cumulative embodiments, at least one of the auxiliary rollers is on at least one bottom board of each of the at least two pallets when the load wheel has entered a distal pallet of the at least two pallets and contacts a bottom board of the distal pallet.

In some additional, alternative, or selectively cumulative embodiments, each fork further comprises at least two auxiliary rollers positioned between the load wheel and the chassis, and the two auxiliary rollers rotatably coupled to the first side wall of one of the plurality of forks are between the other two exit rollers rotatably coupled to the second side wall of one of the plurality of forks along the longitudinal axis.

In some additional, alternative, or selectively cumulative embodiments, the forked materials-handling vehicle comprises a pallet truck.

In some additional, alternative, or selectively cumulative embodiments, two distal auxiliary rollers of the fork are closer together along the longitudinal axis than either distal auxiliary roller is to a proximal auxiliary roller, where the two distal auxiliary rollers are the closest two auxiliary rollers to the load wheel assembly and the proximal auxiliary roller is one of the closest two auxiliary rollers to the chassis.

In yet another embodiment, a fork assembly for a forked materials-handling vehicle with a chassis, such as a pallet truck, is configured to simultaneously lift at least two inline pallets, and each pallet comprises a plurality of bottom boards. The fork includes a plurality of auxiliary rollers and a proximal end and a distal end along a longitudinal axis, where the proximal end is attached to the chassis. The fork includes a load wheel connected to the fork, and the fork has a length sufficient to lift at least two pallets arranged in an inline configuration. The plurality of auxiliary rollers are rotatably coupled to the fork, and the plurality of auxiliary rollers are positioned longitudinally along the length of the fork such that at least one of the auxiliary rollers is on at least one bottom board of a proximal pallet of the at least two pallets when the load wheel has entered the proximal pallet and contacts a bottom board of the at least two pallets.

In another embodiment, a method reduces shunting of two in-line pallets when operating a forked materials-handling vehicle with elongated forks and a plurality of auxiliary rollers. Each pallet has a plurality of bottom boards extending across the width of the pallet. The method (1) causing the materials-handling vehicle to take a straight-in approach to the pallets such that a longitudinal axis of the vehicle is at least approximately perpendicular to the bottom boards as the forks of the forklift contact the pallet; (2) causing the elongated forks to enter a pocket of a first pallet; (3) causing, during a first interval, a load wheel supported by an elongated fork of the vehicle to contact a bottom board of the first pallet; (4) causing, during the first interval, an auxiliary roller supported by the elongated fork of the vehicle to contact a top surface of and to apply a downward force on one of the bottom boards of the first pallet; (5) causing the elongated forks to enter a pocket of a second pallet; (6) causing, during a second interval, the load wheel supported by the elongated fork of the vehicle to contact a bottom board of the second pallet; and (7) causing, during the second interval, a first auxiliary roller supported by the elongated fork of the vehicle to contact the top surface of and to apply a downward force on one of the bottom boards of the first pallet and a second auxiliary roller supported by the elongated fork of the vehicle to contact a top surface of and to apply a downward force on one of the bottom boards of the second pallet.

In some additional, alternative, or selectively cumulative embodiments, at least one auxiliary roller is an entry roller between the load wheel and a tip of the elongated fork of the vehicle.

In some additional, alternative, or selectively cumulative embodiments, at least one auxiliary roller is rotatably coupled to a side wall of the elongated fork between the load wheel and a chassis of the vehicle.

In some additional, alternative, or selectively cumulative embodiments, at least one auxiliary roller includes a load wheel auxiliary roller rotatably coupled to a load wheel bracket, and the load wheel auxiliary roller and the load wheel are rotatably coupled to the load wheel bracket, and the load wheel auxiliary roller has a width or diameter that is smaller than the load wheel.

As one skilled in the art will appreciate in light of this disclosure, certain embodiments of the forked materials-handling vehicle and designs therefor that are disclosed herein may be capable of achieving certain advantages, including, in some cases, one or more of the following: (1) Having at least one auxiliary roller or the load wheel applying a downward vertical force on at least one bottom board for each in-line pallet for each position of the fork passing through the in-line pallets; (2) keeping a single unloaded or lighted-loaded pallet or multiple in-line unloaded or lighted-loaded pallets substantially stationary on a floor when the forks enter or exit a partially closed-bottom pallet; (3) reducing the shunting or the horizon force on bottom boards of pallets by the load wheel; (4) reducing damage to a floor or bottom boards of the pallets; (5) reducing operator frustration; and (6) increasing operational efficiency.

Selectively cumulative embodiments are embodiments that include any combination of multiple embodiments that are not mutually exclusive.

The foregoing and other advantages of various embodiments will be apparent from the following detailed description of example embodiments, which proceeds with reference to the accompanying drawings, which are briefly introduced immediately below.

BRIEF DESCRIPTION OF THE DRAWINGS

FIG. 3A is a side section view of a pallet truck with elongated forks and auxiliary rollers according to one embodiment.

FIG. 3B is a bottom view of the pallet truck with elongated forks and auxiliary rollers in the configuration of FIG. 3A.

FIG. 4C is a zoomed-in side section view of elongated forks and auxiliary rollers in the configuration of FIG. 3A.

FIG. 4D is a zoomed-in bottom section view of elongated forks and auxiliary rollers in the configuration of FIG. 3B.

FIG. 5A is a side section view of a pallet truck with elongated forks and auxiliary rollers according to one embodiment.

FIG. 5B is a bottom view of the pallet truck with elongated forks and auxiliary rollers in the configuration of FIG. 5A.

FIG. 6A is a side section view of a pallet truck with elongated forks and auxiliary rollers according to one embodiment.

FIG. 6B is a bottom view of the pallet truck with elongated forks and auxiliary rollers in the configuration of FIG. 6A.

FIG. 7A is a side section view of a pallet truck with elongated forks and auxiliary rollers according to one embodiment.

FIG. 7B is a bottom view of the pallet truck with elongated forks and auxiliary rollers in the configuration of FIG. 7A.

FIG. 8A is a side section view of a pallet truck with elongated forks and auxiliary rollers according to one embodiment.

FIG. 8B is a bottom view of the pallet truck with elongated forks and auxiliary rollers in the configuration of FIG. 8A.

FIG. 9A is a side section view of a pallet truck with elongated forks and auxiliary rollers according to one embodiment.

FIG. 9B is a bottom view of the pallet truck with elongated forks and auxiliary rollers in the configuration of FIG. 9A.

FIG. 10A is a side section view of a pallet truck with elongated forks and auxiliary rollers according to one embodiment.

FIG. 10B is a bottom view of the pallet truck with elongated forks and auxiliary rollers in the configuration of FIG. 10A.

FIG. 11A is a side section view of a pallet truck with elongated forks and auxiliary rollers according to one embodiment.

FIG. 11B is a bottom view of the pallet truck with elongated forks and auxiliary rollers in the configuration of FIG. 11A.

FIGS. 14A-14C are side section views of elongated forks and auxiliary rollers, pallet entry rollers, and a load wheel auxiliary roller with dimensions in the configuration of FIG. 3B.

FIGS. 15A-15P are side section views of elongated forks entering two in-line pallets according to one embodiment.

DETAILED DESCRIPTION OF EMBODIMENTS

Preliminary Notes

Figure 1A:
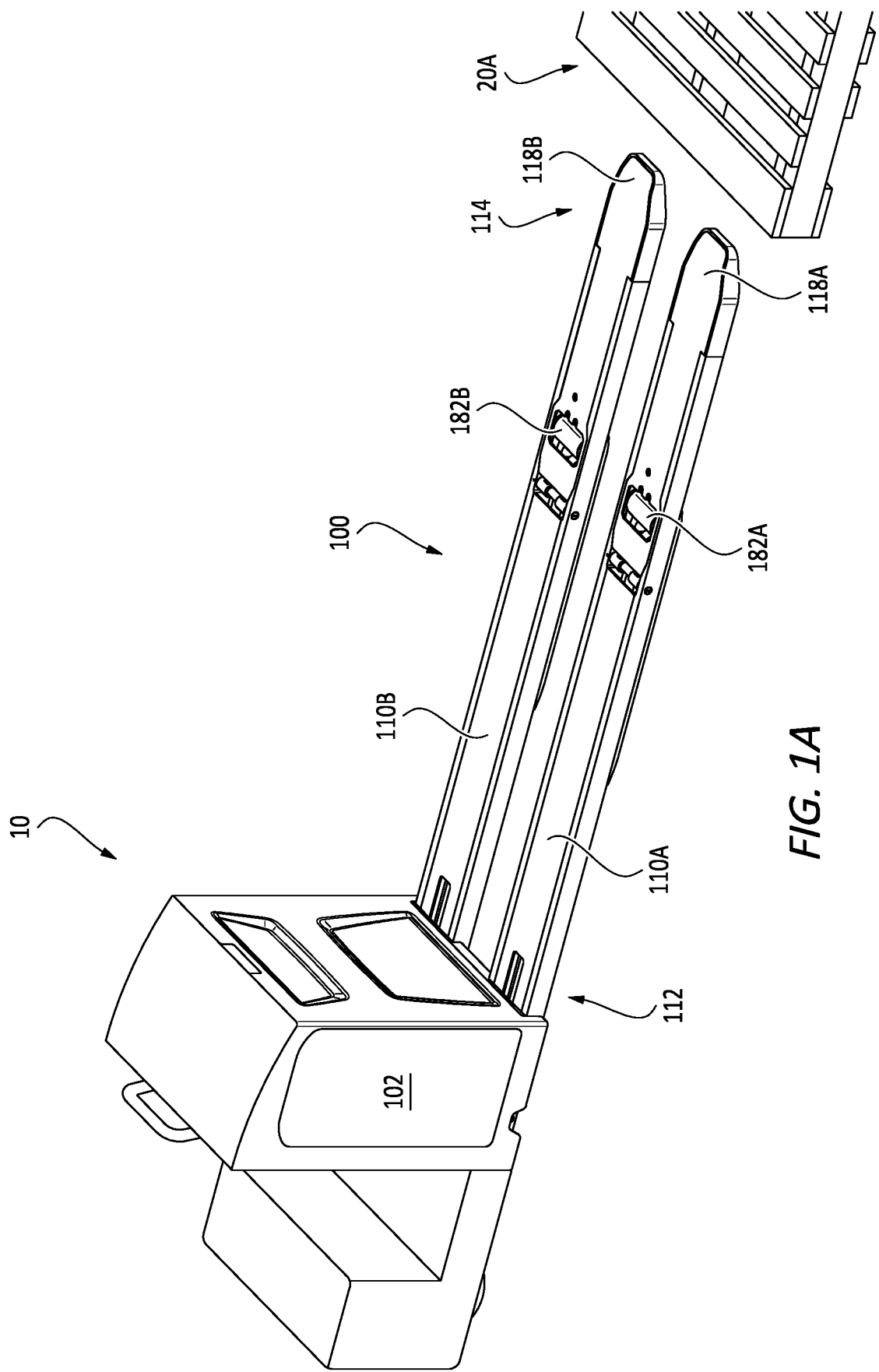
FIG. 1A is a perspective view of a pallet truck with elongated forks according to one embodiment.

Example embodiments are described below with reference to the accompanying drawings. Unless otherwise expressly stated, the sizes, positions, etc., of components, features, elements, etc., as well as any distances therebetween, are not necessarily to scale, and may be disproportionate and/or exaggerated for clarity.

The embodiments described herein are merely examples, set forth by way of illustration only and not limitation. Those skilled in the art will recognize in light of the teachings herein that there are alternatives, variations and equivalents to the example embodiments described herein and their component parts. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, are open-ended and specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The same is true of labels like (a), (b), (c); (A), (B), (C); or (1), (2), (3), etc. The section headings used herein are for organizational purposes only and are not to be construed as limiting the subject matter described.

Unless indicated otherwise, the terms "about," "thereabout," "substantially," "approximately," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all functional or operative connections may be direct or indirect. Similarly, unless clearly indicated otherwise, all physical connections may be rigid or non-rigid, permanent or temporary, direct or indirect (e.g., via intermediary components).

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

Not every feature shown in every drawing is labeled with a reference number, even though the same feature may be labeled with a reference number on other drawings. Reference numbers have been omitted where it is believed they would unnecessarily clutter a drawing. However, all rights are reserved to add reference numbers to the drawings to clarify aspects of the embodiments. Moreover, some views omit some features shown in other views. Finally, the drawings sometimes illustrate variations from one drawing to another, even where those drawings are intended to depict the same embodiment.

Overall System

Figure 1B:
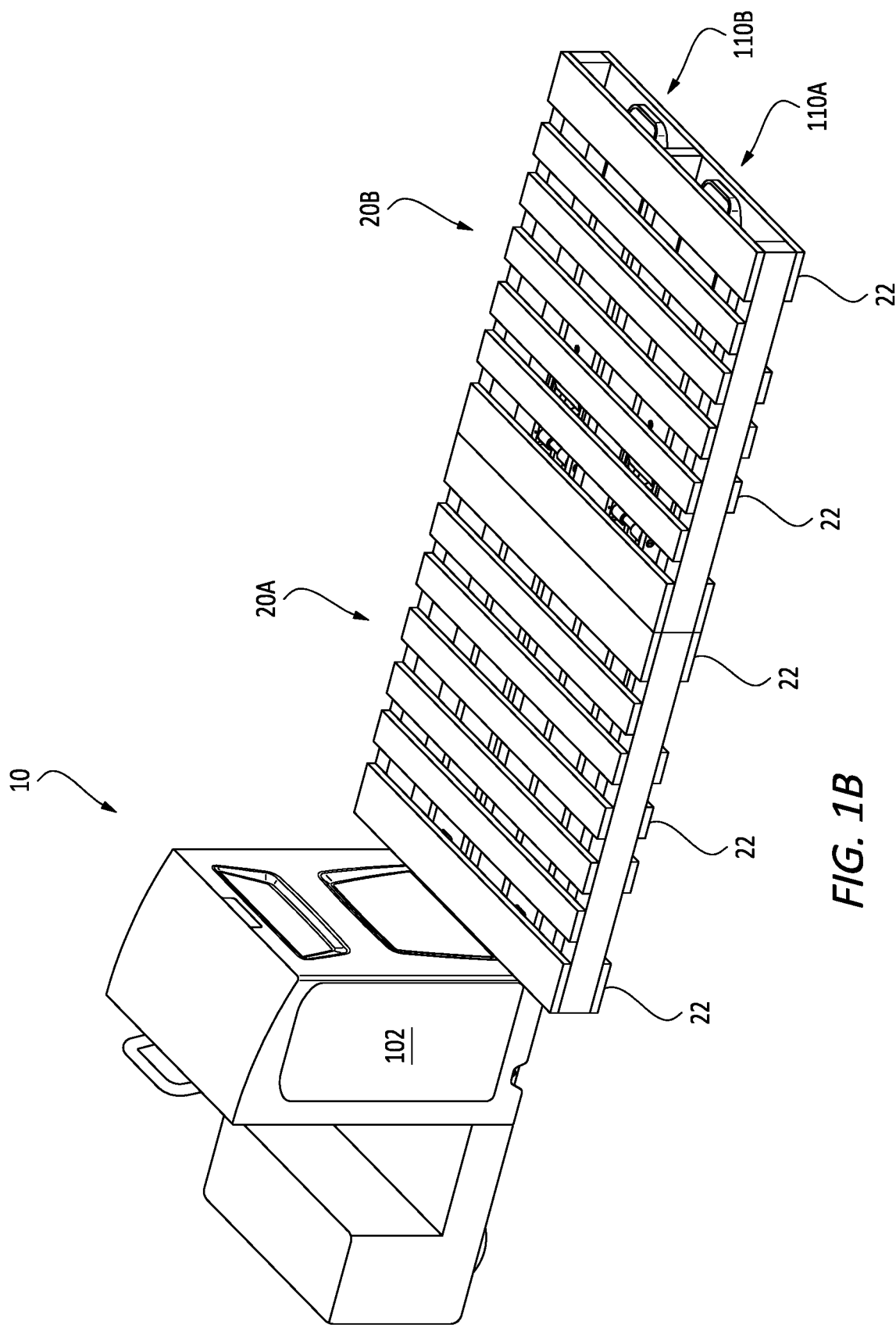
FIG. 1B is a perspective view of a pallet truck with elongated forks and two in-line pallets according to one embodiment.

FIG. 1A is a perspective drawing of a pallet truck 10 with a pair of elongated forks 110 of a fork assembly 100, according to one embodiment. An elongated fork 110 as used herein is also referred to as a fork 110. FIG. 1B is a perspective drawing of a pallet truck 10 with the pair of elongated forks 110, including a right fork 110A and a left fork 110B, inserted into two in-line pallets 20A and 20B, according to one embodiment. The pallet 20A and pallet 20B may be the same type or configuration or a different type or configuration, as described below. As used herein or the drawings, a component or feature of the fork assembly 100 (or fork assemblies 100A-100H) may be appended with a letter to distinguish one fork from an adjacent fork, where "A" represents components or features of the right fork 110A and "B" represents components or features of the left fork 110B as viewed from the chassis 102 towards the distal end 114 of the fork assembly 100. As the components or features of the fork assembly 100 are similar between the right fork 110A and the left fork 110B, the label without the appended letter may be used indicating that the feature applies to both forks 110. For clarity and ease of description, the appended letter of the label may be left off in this description. When the components or features of the right fork 110A and the left fork 110B differ, a letter may be appended to the label with the difference described. When the label is used with other components or features without the appended letter, such as with a pallet 20, any of the described pallets 20A-20D with the appended letter may apply to the label with its description.

In an embodiment, the pallet truck includes a body, frame, or chassis 102 on an operator end to support features, such as a steering mechanism or power system to move the pallet truck, a lifting mechanism for raising and lowering the forks 110 vertically from a floor, operator controls or platform (or seating), and other controls and mechanisms. The forks 110 are coupled to the chassis 102 on the operator end or a proximal end 112 and designed to enter the pallets 20 with tips 118 on a distal end 114. The lifting mechanism includes features to raise and lower both the proximal end 112 and distal end 114 of the forks 110 in a relatively level or parallel orientation with the floor/ground. The distal end 112 of each of the forks 110 is raised with a lever action on load wheel assemblies 180 that pivots and moves load wheels 182 downward away from the forks 110. The forks 110 are lowered with an opposite lever action on load wheel assemblies 180 that pivots and moves load wheels 184 closer to and into the forks 110. The elongated forks 110 are designed to carry and move at least two in-line pallets 20 simultaneously.

A challenge occurs with elongated forks 110, especially with multiple in-line unloaded or lighted-loaded pallets 20, when the forks 110 enter or exit a partially closed-bottom pallet (also called a "closed pallet") 20 with bottom boards or base boards 22. As used herein, the base boards of a pallet are referred to as "bottom boards." When the load wheel 182 encounters a low height obstacle, such as bottom boards 22, the load wheel 182 is designed to climb over the obstacle. When the pallet 20 is loaded, the weight of the pallet creates a sufficient downward force on the floor and along with the pallet's friction with the floor to keep the pallet 20 relatively or sufficiently stationary when the load wheel 182 strikes the bottom boards. When the load wheel 182 strikes the bottom boards 22 of an empty, unloaded, or lightly-loaded pallet 20, the load wheel 182 may exert a horizontal force on the bottom board 22 and shunt or push the pallet 20 horizontally instead of climbing over the bottom board 22. This shunting or horizontal movement of the pallet 20 can occur on the entry or the exit of the forks 110 into or out of the pallet 20 so the pallet is displaced from the intended entry or exit position. This horizontal movement can be more problematic with elongated forks 110 and in-line pallets 20 when attempting to maintain a desired spacing between two pallets 20. For example, when the forks 110 are removed from the in-line pallets 20, the first pallet 20A may be pushed away from the second pallet 20B after the load wheels strike the bottom boards 22 of the first pallet 20A creating an undesirable gap. This disclosure describes wheels, rollers, and mechanisms on the elongated forks 110 to apply a downward force on at least one bottom boards 22 of each pallet 20 while the load wheels 182 and forks 110 are entering and exiting pallets 20 to reduce shunting.

Pallet Configurations

Figure 2A:
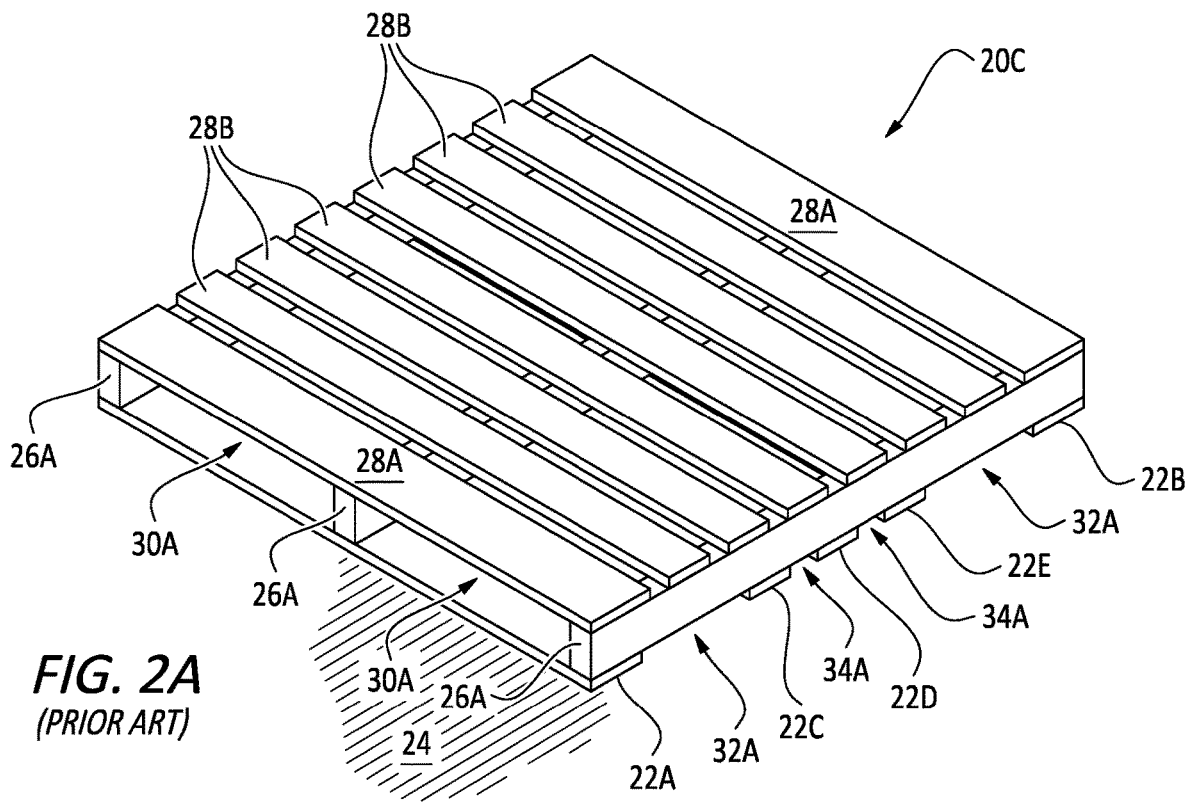
FIG. 2A is a perspective view of a pallet.
Figure 2B:
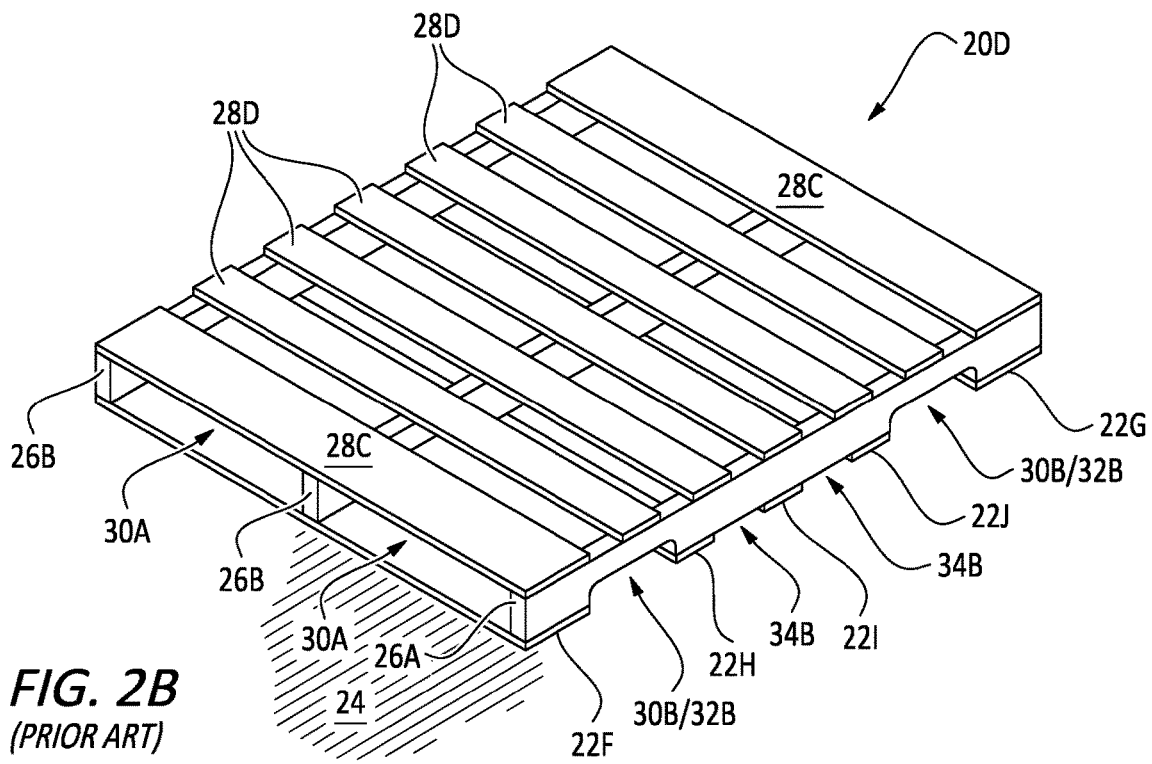
FIG. 2B is a perspective view of another pallet.

A brief introduction to closed-bottom pallets and their features is described to better understand the use and placement of wheels, rollers, and mechanisms on elongated forks 110, as described later below. FIGS. 2A-2B are isometric or perspective illustrations of an example of a closed-bottom pallets 20 that is commonly used in the United States and Australia. The closed pallet 20 has one or more bottom boards 22 that contact a supporting surface 24, such as the floor. The bottom boards 22 provide the foundation for spacers 26 that support one or more upper planks 28 that support a load. A spacer 26 that is orthogonal or transverse to the upper planks 28 and the bottom boards 22 and extends between and including end bottom boards 22A, 22B, 22F, and 22G (and extend between and including end upper planks 28A and 28C) is called a stringer 26. The length of the stringer 26 is typically the length of the pallet 20. A conventional closed pallet 20 has three stringers 26A and 26B with a stringer 26 on each side with a stringer in the center 26. The length of the upper planks 28 or the bottom boards 22 (transverse to the stringer 26) is typically the width of the pallet 20. Gaps between the upper planks 28 and the floor or the upper planks 28 and the bottom boards 22 are referred to as entry and exit pallet pockets 30 or windows. The tips 114 of the forks 110 of the pallet truck 10 entry and exit pallet pockets 30. The height of the entry and exit pallet pocket 30 (or height of the spacer or stringer 26) combined with the thickness (or height) of the upper planks 28 and the bottom boards 22 is typically the height of the pallet 20. A pallet with pallet pockets 30A on two sides is referred to as a two-way entry pallet. A pallet with pallet pockets on four sides is referred to as a four-way entry pallet, which allows the pallet to be entered and moved from any side. In some embodiments, the four-way entry pallet may be similar to the two-way entry pallet but may have openings or notches 30B in the spacers 26 for additional pallet pockets.

The pallets in various regions, such as the United Kingdom, Europe, the United States, and Australia, have various pallet materials and configurations, including dimensions, which may differ between regions and within regions. The conventional pallet 20 is often made of wood, but it is also possible that some or all of the conventional pallet 20 may be other material(s), such as metal (e.g., steel and aluminum), polymer (e.g., plastic, like high density polyethylene (HDPE)), paper, or engineered wood products. Typically, wood pallets are the cheapest and thus comprise a large portion of the pallets in the world. FIG. 2A illustrates a wood Australian CHEP 10001 pallet 20C configuration, which is commonly used in Australia, with a standard size (length× width×height) of 1165 millimeters (mm)×1165 mm×150 mm (45.9 inches (")×45.9"×5.9"). The CHEP 10001 pallet 20C may have 7 or 8 upper planks 28. FIG. 2A illustrates the CHEP 10001 pallet 20C with 8 upper planks. Later, FIGS. 15A-15P illustrates the CHEP 10001 pallet 20C with 7 upper planks. FIG. 2B illustrates a wood United States (US) Grocery Manufacturers Association (GMA) stringer pallet 20D, which is commonly used in the in North America to transport grocery items with a nominal size of 1219.2 mm×1016 mm×120.65 mm (48"×40"×4.75"). Standard European pallets include an EPAL 1 (not shown) and an EPAL 2 (not shown). Embodiments illustrated and described in this disclosure may be used with different pallet configurations, including those pallet configurations mentioned as well as other pallets similar in features and design.

Typically, pallets are symmetrical, so opposite horizontal sides have similar features. For example, bottom boards 22, spacers 26, and upper planks 28 have the same size and orientation on sides of opposite entry and exit pallet pockets 30. For ease of description with conventional wood pallets, the primary entry and exit pallet pockets 30 are parallel with the length or the longitudinal axes of the upper planks 28. The front or rear of the pallet refers to the sides with the primary entry and exit pallet pockets 30. For ease of description, the front of the pallet refers to the side of the pallet initially entered by the tips 114 of the forks 110, even though the front and rear of the pallet may have similar or symmetrical features.

As shown in FIGS. 2A-2B, a conventional wood pallet 20 can include bottom boards 22, spacers 26, and upper planks 28. As illustrated, spacers 26 extend from the end bottom boards (e.g., including a front bottom board 22A and 22F and a rear bottom board 22B and 22G) which are wider than center or middle bottom boards (e.g., three middle bottom boards 22C-22E and 22H-22J). For example, in the GMA stringer pallet 20D, the front and rear bottom board can have a width of 5.5" while the middle bottom boards have a width of 3.5". The front and rear bottom boards have a large spacing 32A and 32B (e.g., 9.5" for the GMA stringer pallet 20D) to adjacent middle bottom boards that is greater than the small spacing 34A and 34B between middle bottom boards (e.g., 3.75" for the GMA stringer pallet 20D). This large spacing 32 is designed for placement of the load wheels 182 to lift the forks 110 and the pallet 20. The width and placement of the bottom boards 22 and spacing 32 and 34 between the bottom boards 22 for a particular pallet type or configuration can vary the optimal placement of wheels, rollers, and mechanisms on elongated forks 110 for a pallet truck designed for that pallet type or configuration.

The original GMA specification is now obsolete, but it still has some generally accepted parameters that often include: Stringers 26 are 1⅛"-1⅜"×3½"×48". Stringers 26 have two notches 30B in the side to allow for pallet truck entry making it a four-way pallet. The top and bottom deck boards (or upper planks 28 and bottom boards 22) are ½"-⅝" thick. The top of the pallet 20D has a 5½"×40" board on each end, and five 3½"×40" boards in the center. Bottom of the pallet 20D has a 5½"×40" board on each end, and three 3½"×40" boards positioned between the notches. Alternate acceptable construction for GMA pallet is six 5½"×40" board on top, and four 5½"×40" boards on the bottom.

Fork Assembly

Figure 4A:
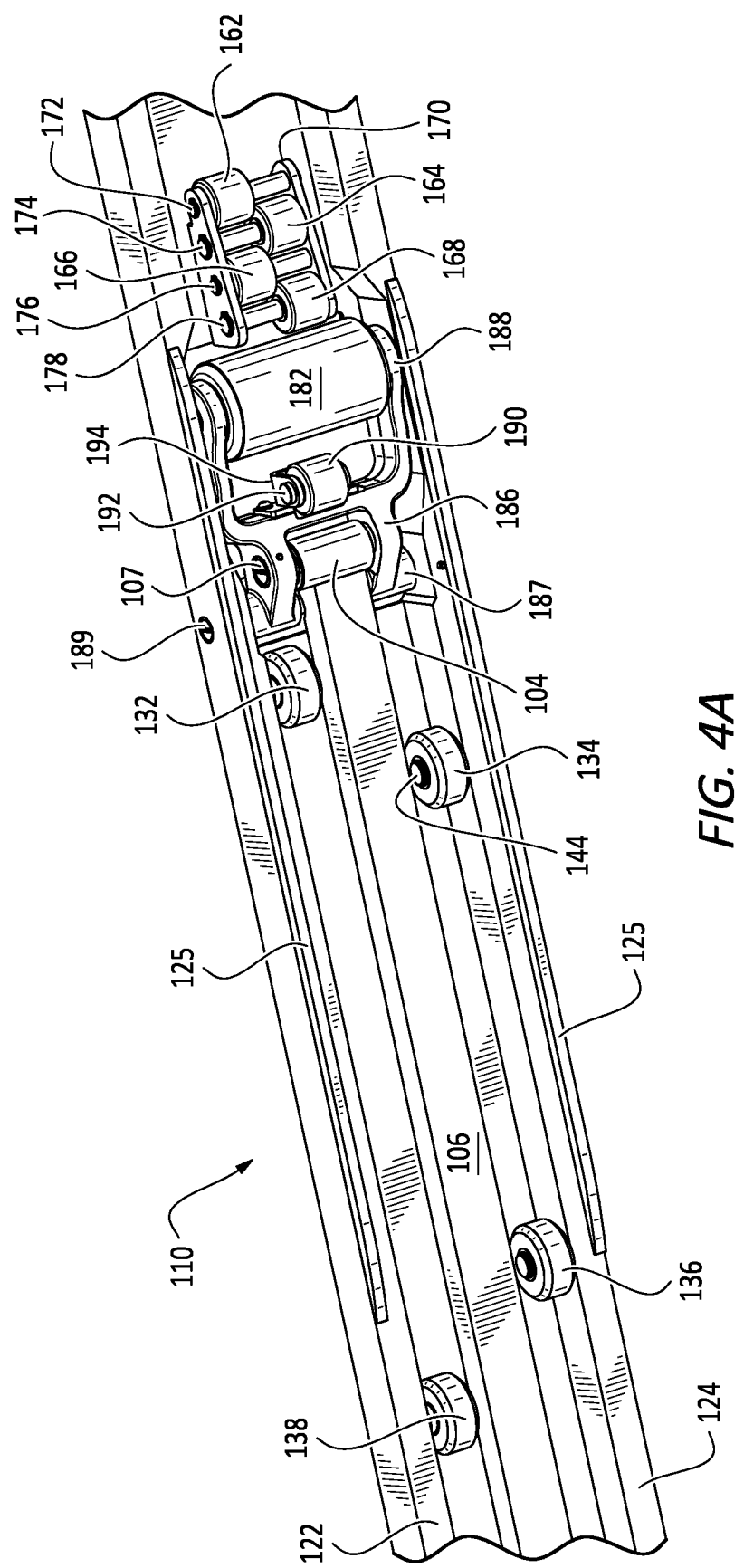
FIG. 4A is a zoomed-in bottom section perspective drawing of elongated forks with top surface removed and auxiliary rollers in the configuration of FIG. 3A.
Figure 4B:
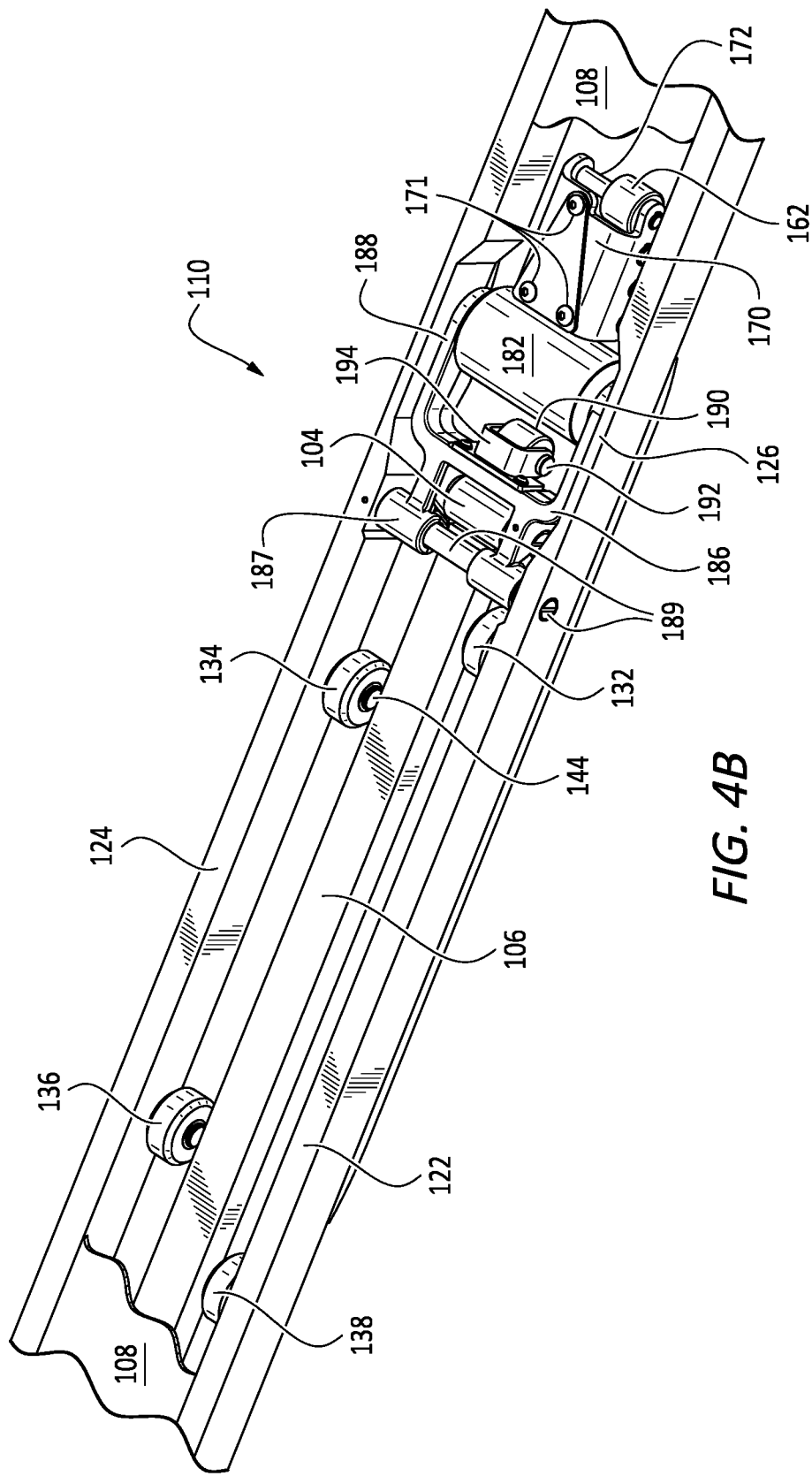
FIG. 4B is a zoomed-in cut-away top section perspective drawing of elongated forks and auxiliary rollers in the configuration of FIG. 3A.
Figure 12A:
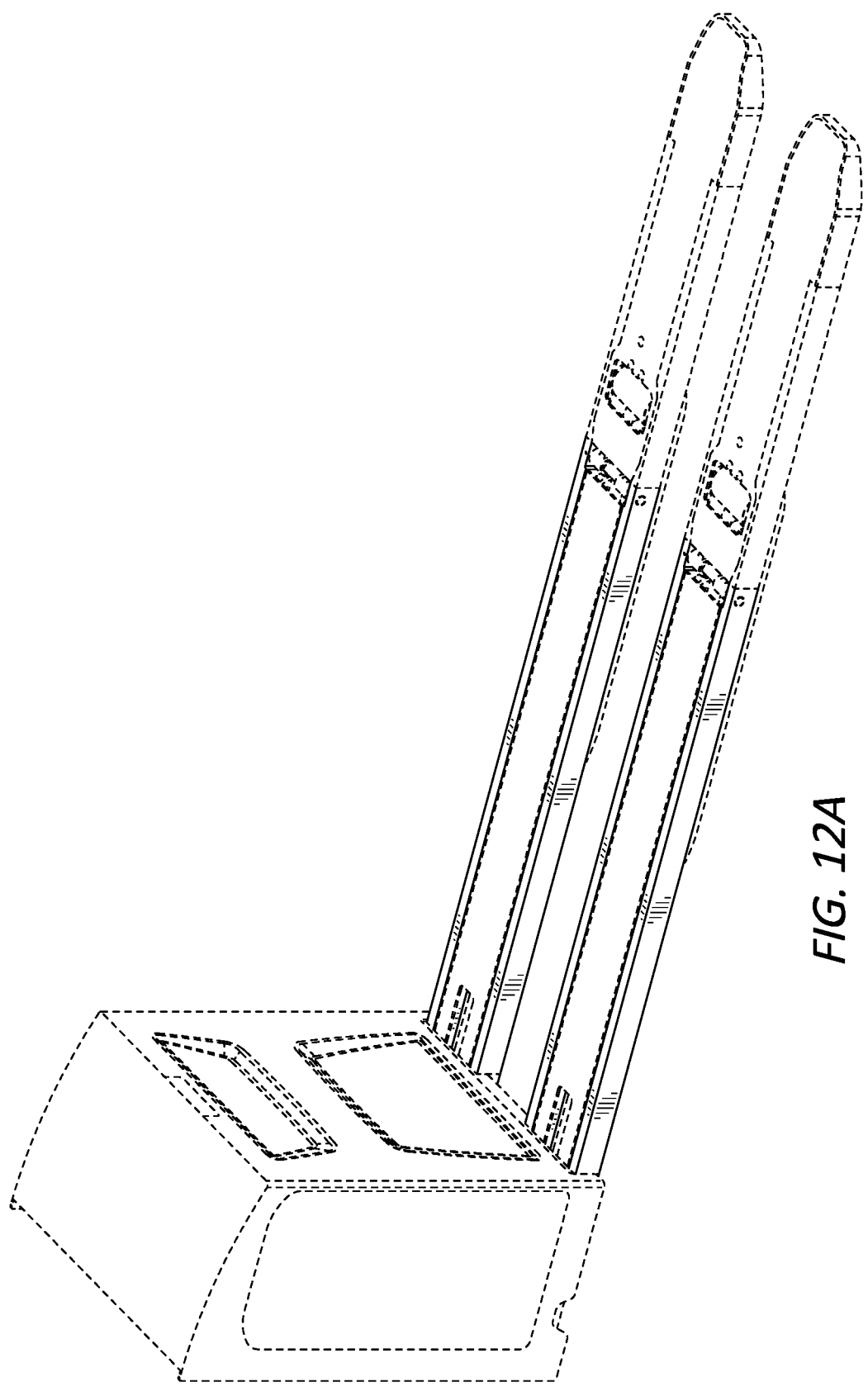
FIG. 12A is a perspective top view of elongated forks and auxiliary rollers according to one embodiment.
Figure 12B:
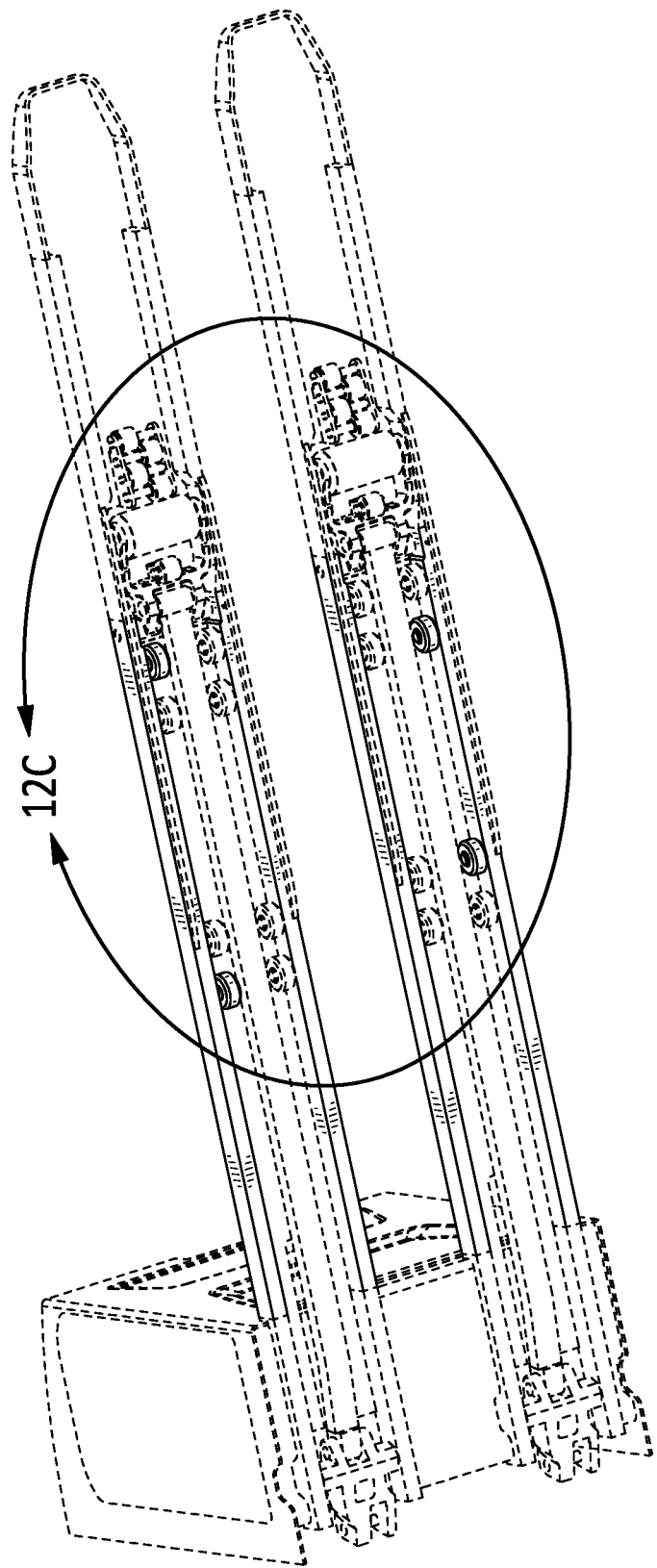
FIG. 12B is a perspective bottom view of elongated forks and auxiliary rollers in the configuration of FIG. 12A.
Figure 12C:
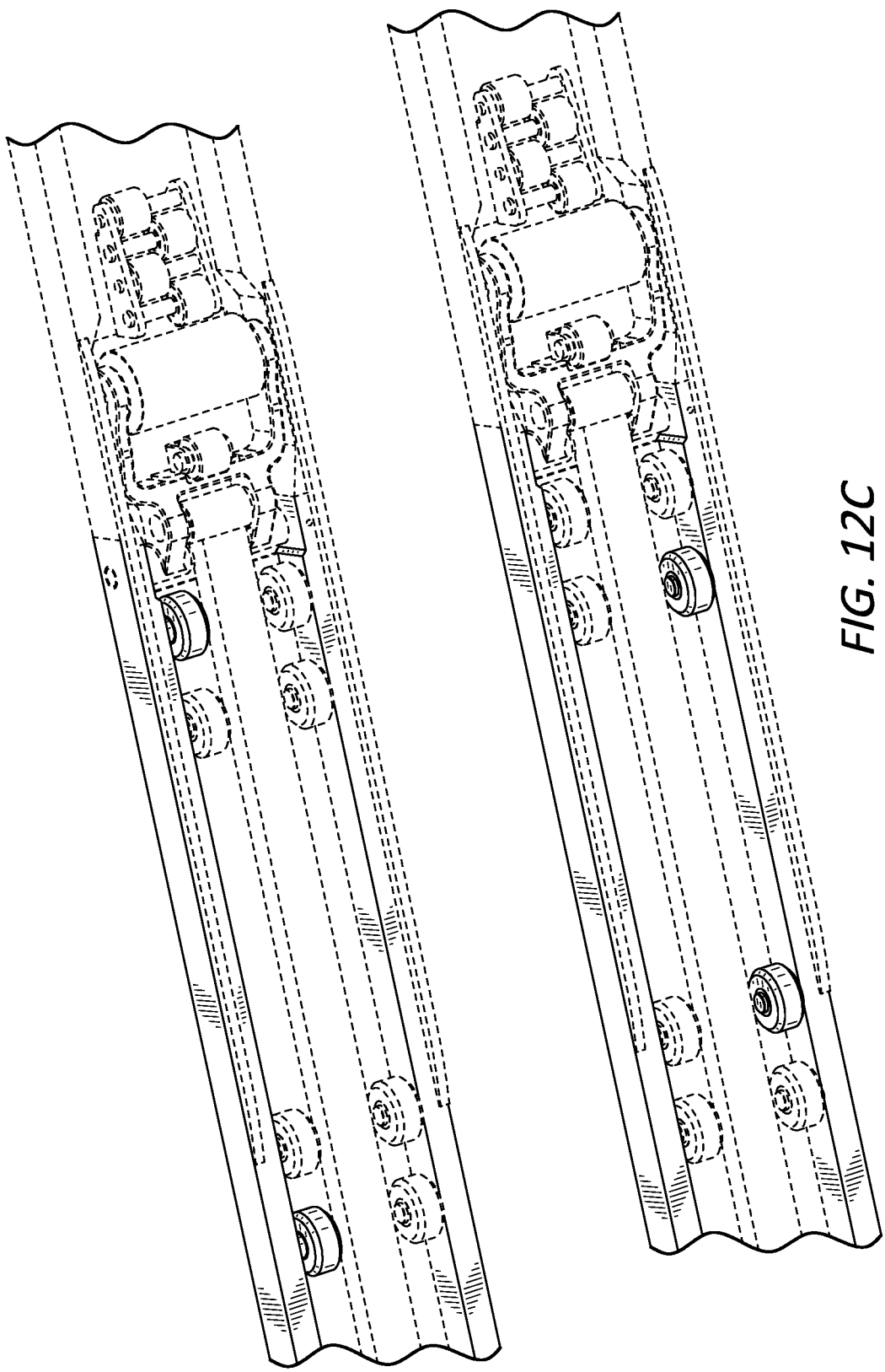
FIG. 12C is a zoomed-in perspective bottom view of elongated forks and auxiliary rollers in the configuration of FIG. 12B.
Figure 12D:
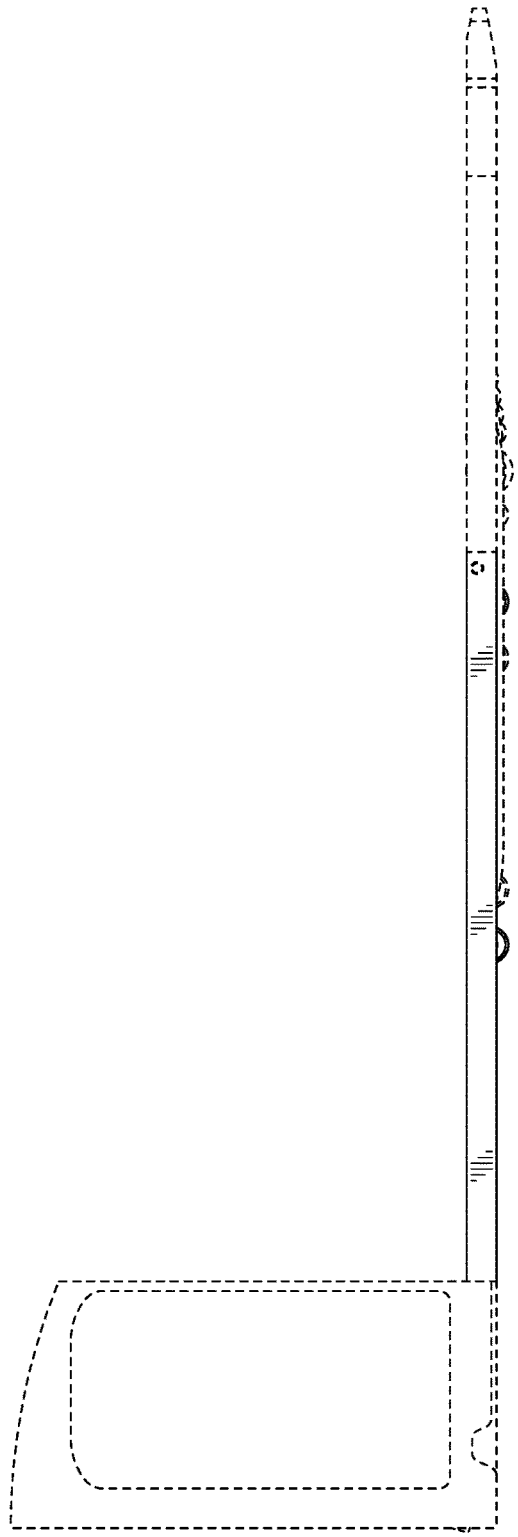
FIG. 12D is a right side view of elongated forks and auxiliary rollers in the configuration of FIG. 12A.
Figure 12E:
FIG. 12E is a left side view of elongated forks and auxiliary rollers in the configuration of FIG. 12A.
Figure 12G:
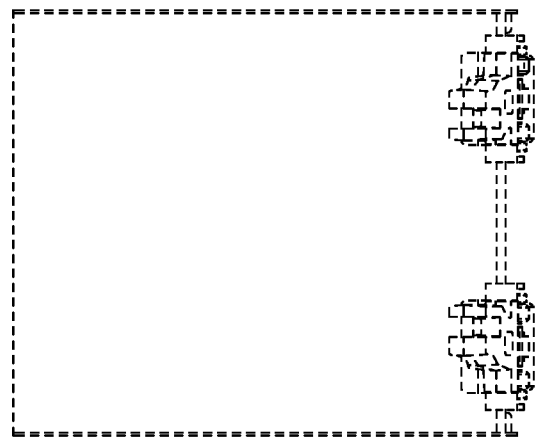
FIG. 12G is a front side view (or non-fork-protruding side view) of elongated forks and auxiliary rollers in the configuration of FIG. 12A.
Figure 12F:
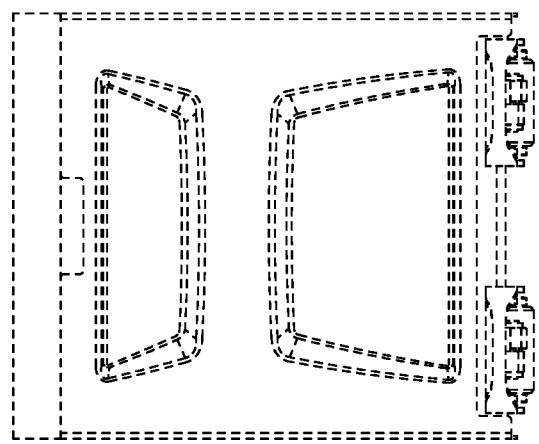
FIG. 12F is a rear side view (or fork-protruding side view) of elongated forks and auxiliary rollers in the configuration of FIG. 12A.
Figure 12H:
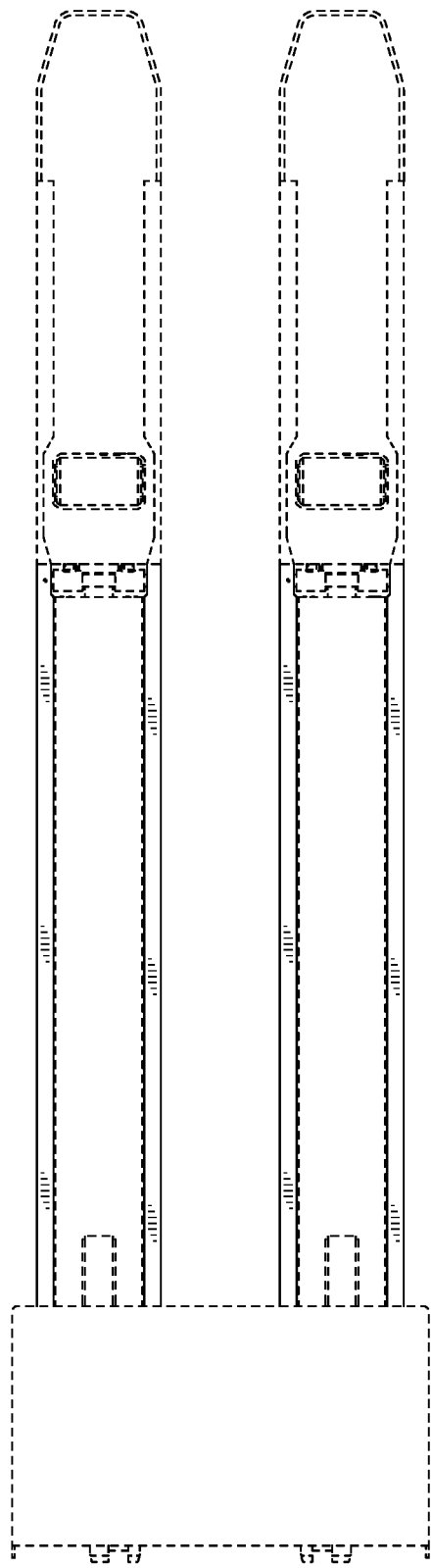
FIG. 12H is a top view of elongated forks and auxiliary rollers in the configuration of FIG. 12A.
Figure 12I:
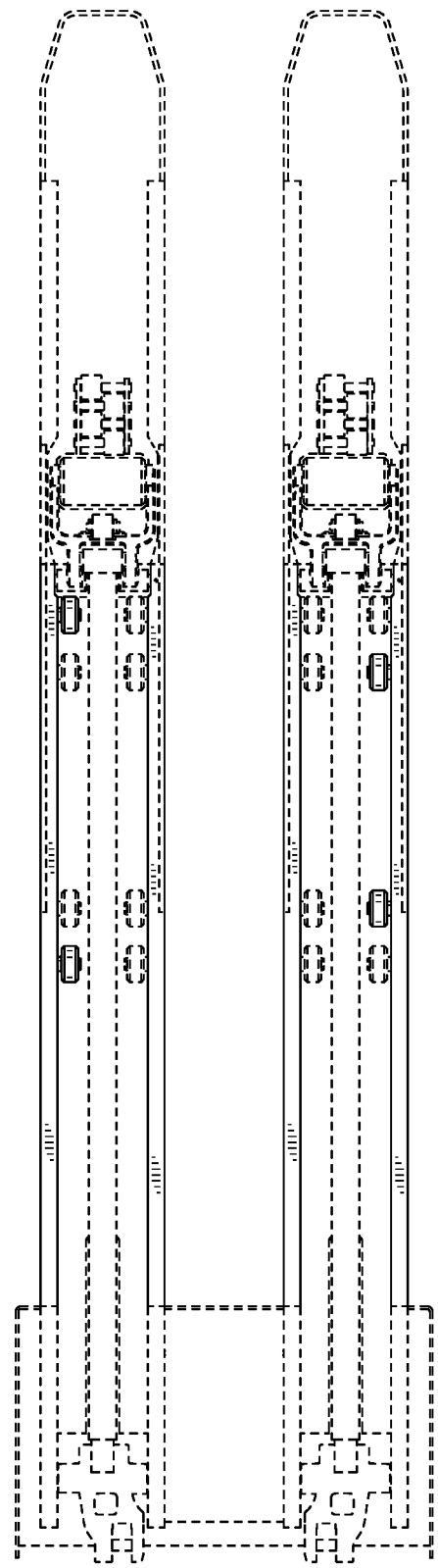
FIG. 12I is a bottom view of elongated forks and auxiliary rollers in the configuration of FIG. 12A.
Figure 13A:
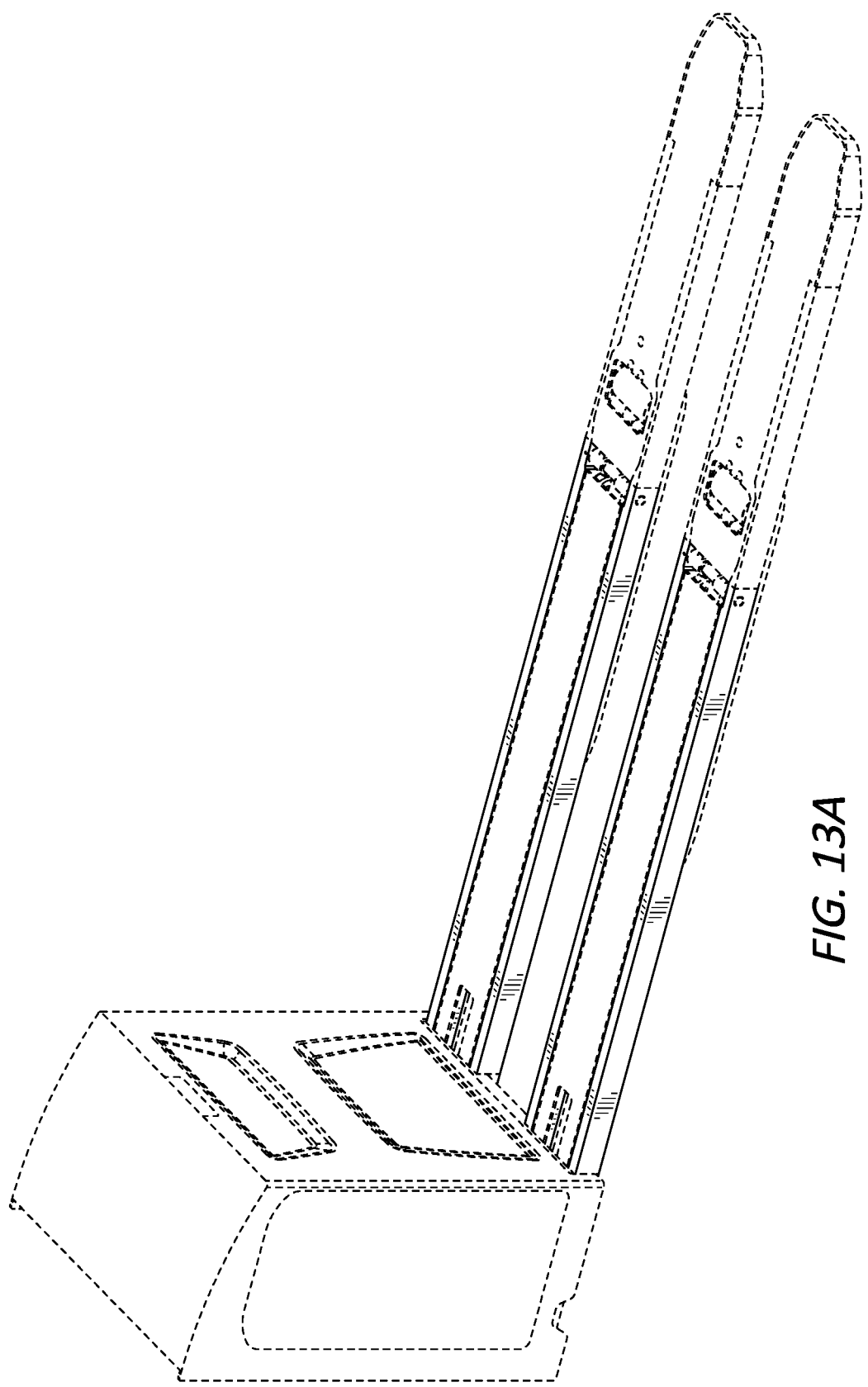
FIG. 13A is a perspective drawing of elongated forks and auxiliary rollers according to one embodiment.
Figure 13B:
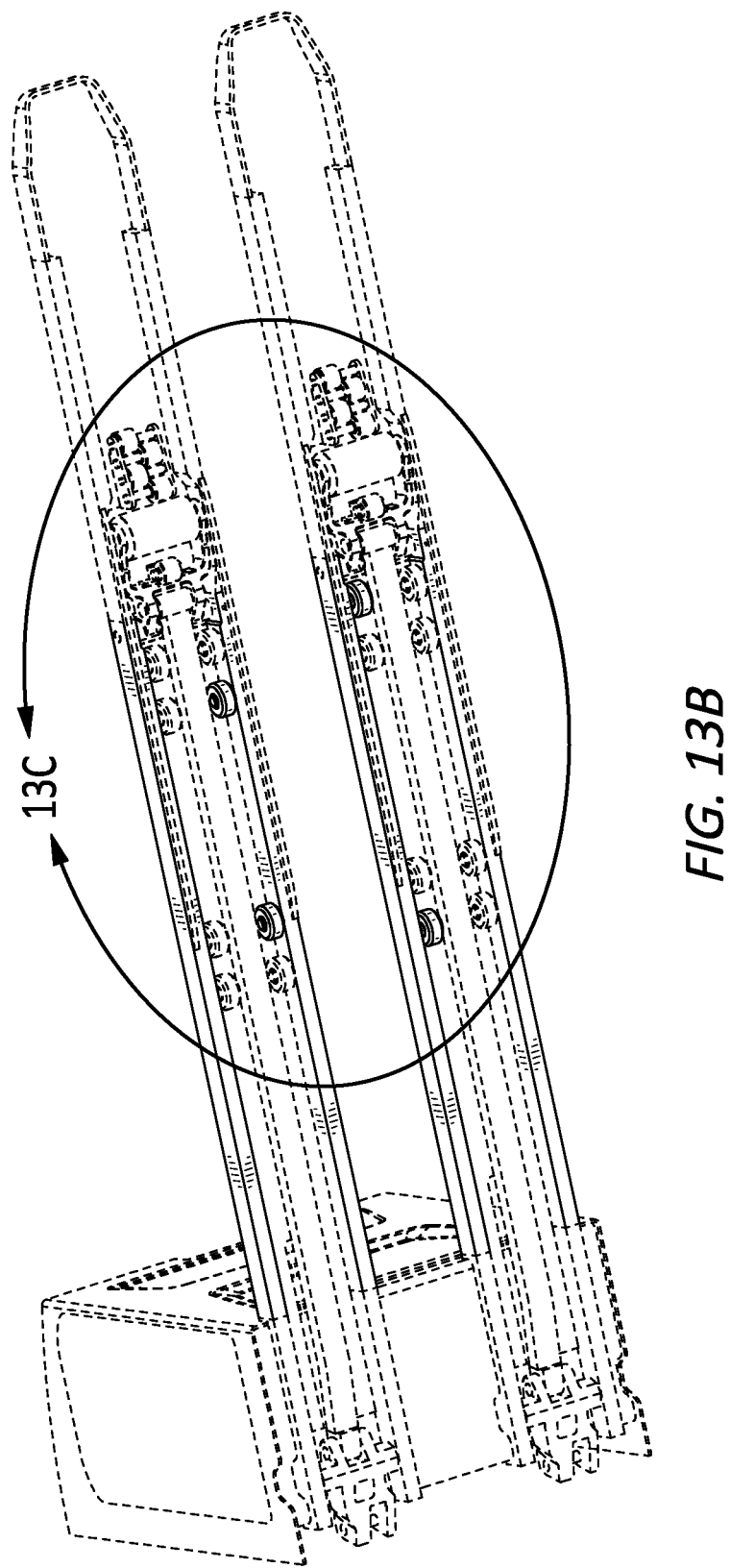
FIG. 13B is a perspective bottom view of elongated forks and auxiliary rollers in the configuration of FIG. 13A.
Figure 13C:
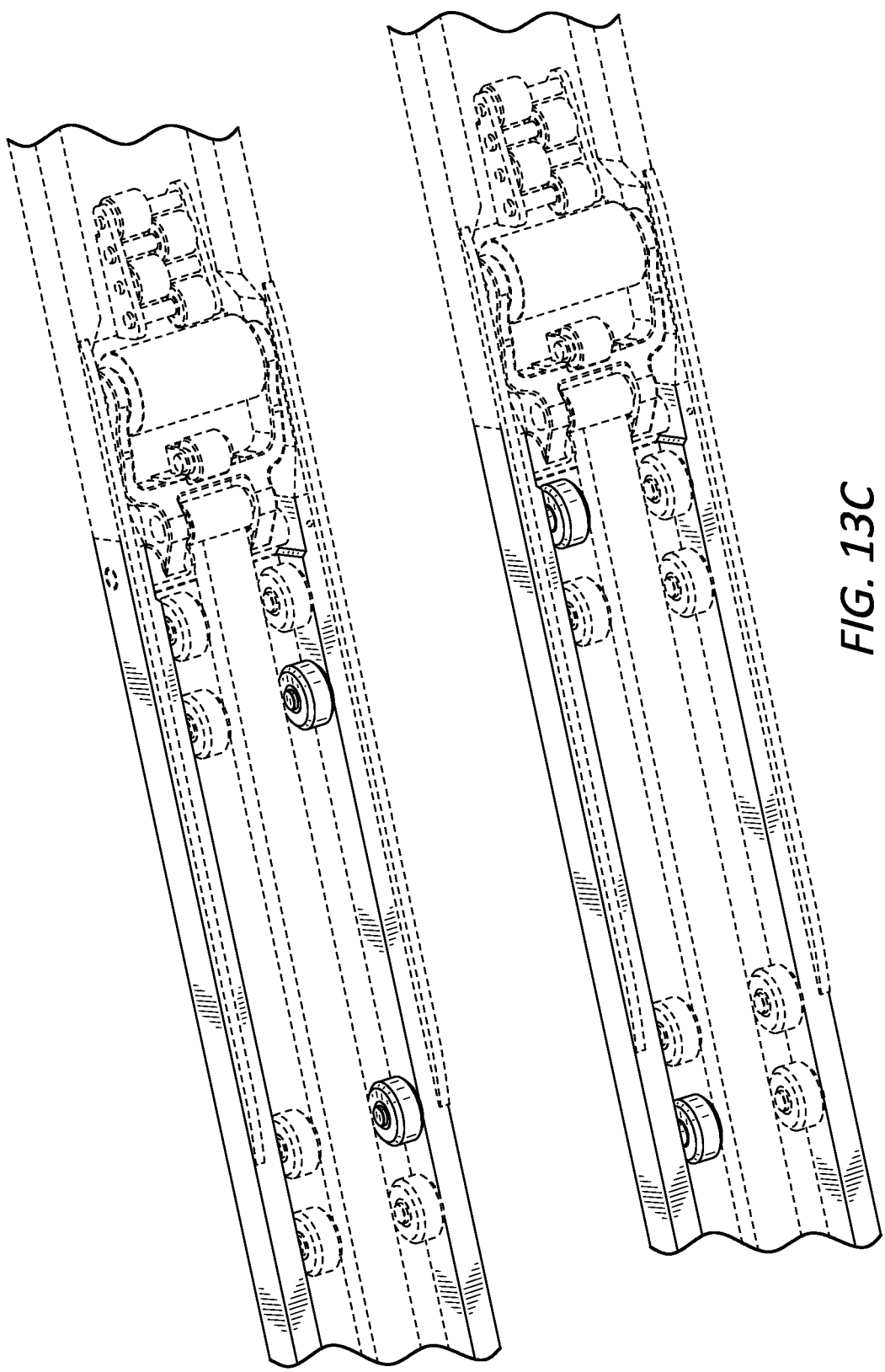
FIG. 13C is a zoomed-in perspective bottom view of elongated forks and auxiliary rollers in the configuration of FIG. 13B.
Figure 13D:
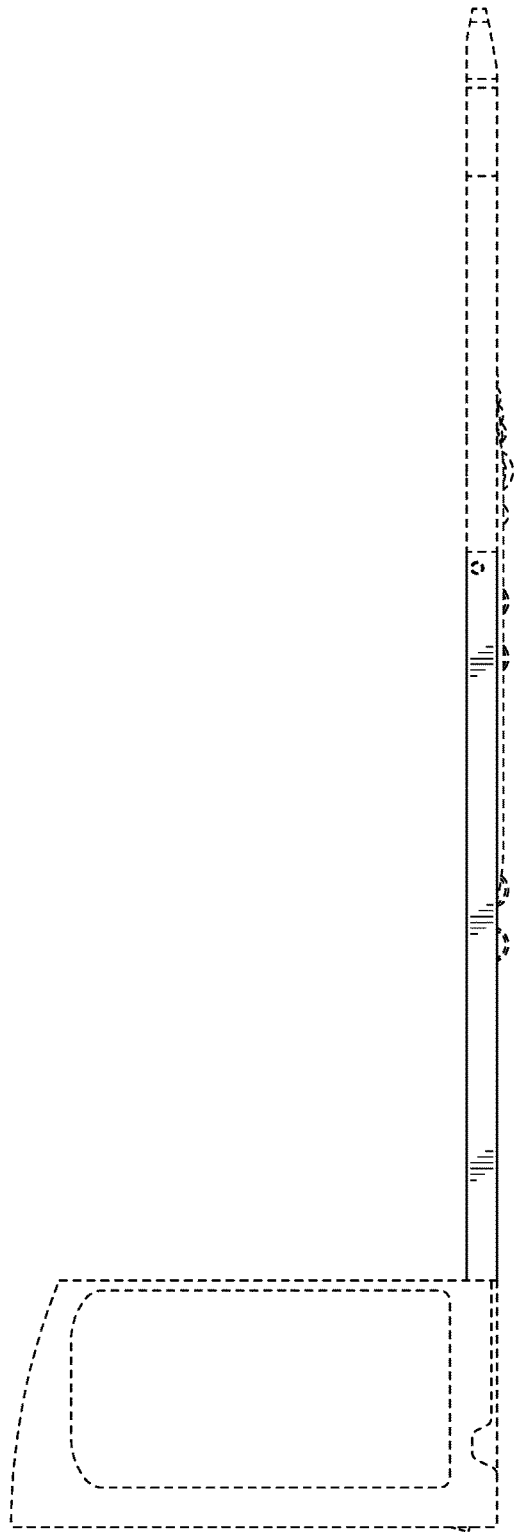
FIG. 13D is a right side view of elongated forks and auxiliary rollers in the configuration of FIG. 13A.
Figure 13E:
FIG. 13E is a left side view of elongated forks and auxiliary rollers in the configuration of FIG. 13A.
Figure 13F:
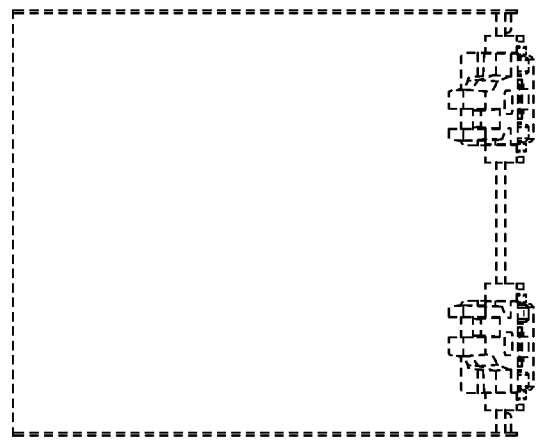
FIG. 13F is a rear side view (or fork-protruding side view) of elongated forks and auxiliary rollers in the configuration of FIG. 13A.
Figure 13G:
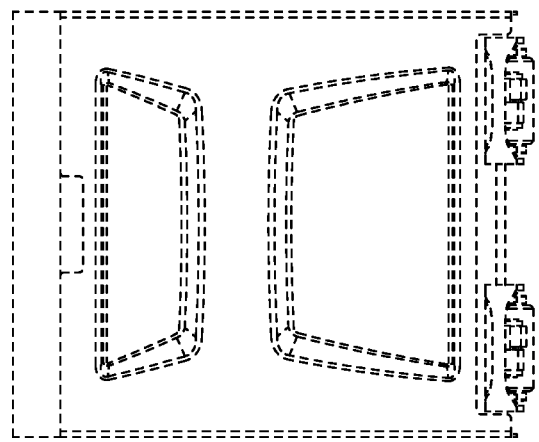
FIG. 13G is a front side view (or non-fork-protruding side view) of elongated forks and auxiliary rollers in the configuration of FIG. 13A.
Figure 13H:
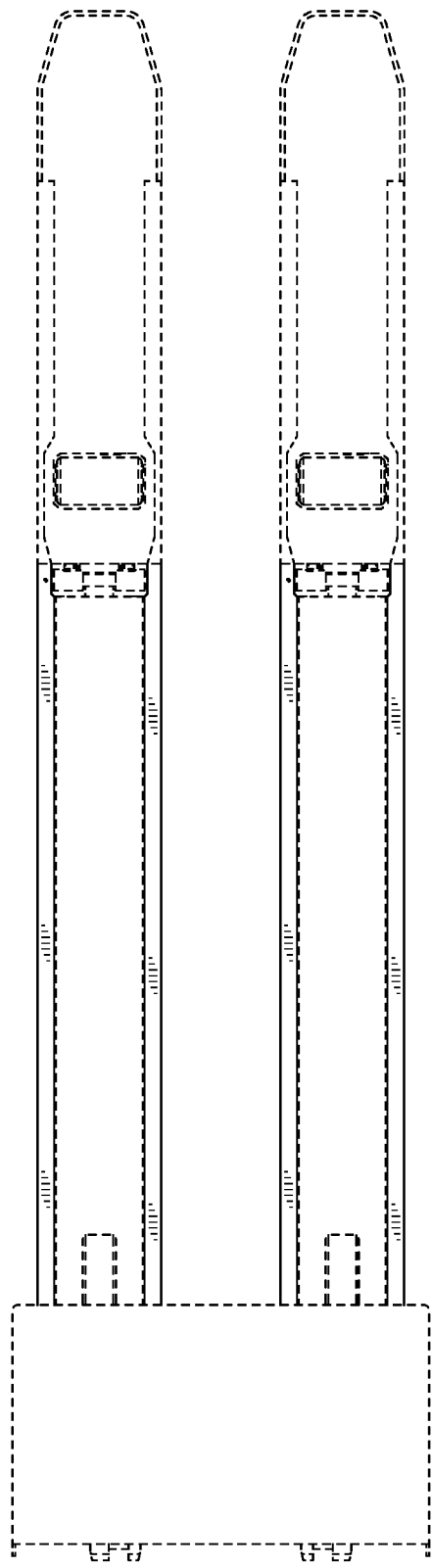
FIG. 13H is a top view of elongated forks and auxiliary rollers in the configuration of FIG. 13A.
Figure 13I:
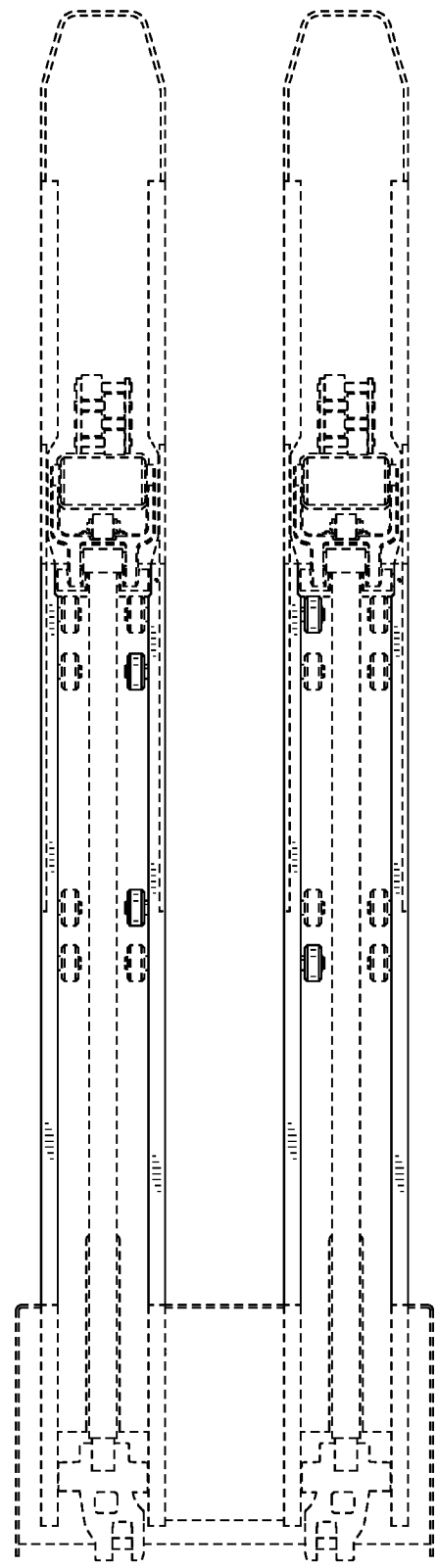
FIG. 13I is a bottom view of elongated forks and auxiliary rollers in the configuration of FIG. 13A.

FIGS. 3A-4D are views of a pallet truck with a fork assembly 100A with elongated forks 110; auxiliary rollers 132, 134, 136, and 138; pallet entry rollers 162, 164, 166, and 168; and a load wheel auxiliary roller 190 according to one embodiment. FIG. 3A is a right-side section view and FIG. 3B is a bottom view. FIGS. 4A-4D are zoomed-in section drawings of FIGS. 3A and 3B. FIG. 4A is a bottom section perspective drawing, FIG. 4B is a top section perspective drawing, FIG. 4C is a side section view, and FIG. 4D is a bottom section view. The right elongated fork 110A and right elongated fork 110B have similar features. The fork assembly 100, including 100A, includes an elongated fork body 110, a load wheel assembly 180, a push/pull rod 106, a pallet entry roller assembly (or entry roller assembly) 160, a set of auxiliary rollers, including auxiliary rollers 132, 134, 136, and 138, pallet entry rollers (or entry rollers) 162, 164, 166, and 168, and a load wheel auxiliary roller 190. The material of the components of the fork assembly 100 can include metal (e.g., steel or aluminum), polymer (e.g., hard plastic), or other hard durable material.

The elongated fork body or fork 110 is an open inverted U-shaped channel, typically comprising a metal (e.g., steel or aluminum). The fork 110 is relatively flat and thin to allow the fork to fit within the entry and exit pallet pocket 30 with a length along a longitudinal axis that extends from within the chassis 102 on the proximal end 112 to the tip 118 on distal end 114. The tip 118 is tapered in both the width and height. The length of the fork 110 is sufficient to support the load of at least two in-line pallets 20A-20B, which may be less than or greater than the length of the at least two in-line pallets 20A-20B. For example, the length of the fork 110 from the chassis 102 may be at least 80%, 90%, or 100% of the length of the at least two in-line pallets 20A-20B. In one embodiment where the fork assembly is configured for two Australian CHEP 10001 pallets 20C, the length of the fork 110 from the chassis 102 may be at least 1864 mm (0.8*2*1165 mm), 2097 mm (0.9*2*1165 mm), or 2330 mm (2*1165 mm). In another embodiment where the fork assembly is configured for two North American GMA stringer pallets 20D, the length of the fork 110 from the chassis 102 may be at least 1951 mm (0.8*2*1219.2 mm), 2195 mm (0.9*2*1219.2 mm), or 2438 mm (2*1219.2 mm). In one embodiment, the length of the fork 110 from the chassis 102 may be at least 2000 mm.

The U-shaped channel of the fork 110 is open on the bottom and includes two side walls, a fork right side wall 122 and a fork left side wall 124, to support a fork top wall 108 that spans the side walls 122 and 124. The side walls 122 and 124 and the top wall 108 may be separate pieces welded together or integrated as a single component. The height of the fork 110 is the vertical distance (along a vertical axis) of the side walls 122 and 124 along with other protruding features, such as side wall flange 125 on the bottom of the side walls 122 and 124. The width of the fork 110 (and the top wall 108) is the horizontal distance perpendicular or transverse to the length (along a transverse axis of the fork 110). The top wall 108 may have openings for different features, such as the load wheel. Conventionally, the thickness (vertical distance) of the top wall 108 is thinner than the thickness (horizontal distance) of the side walls 122 and 124. The side walls 122 and 124 can be a rectangular hollow tube or a solid bar. The side walls 126 may have a reduced thickness to provide space for features, such as the load wheel assembly 180. The side walls 128 may have a reduced thickness at the tips 118. In an embodiment, the push/pull rod 106 passes between the side walls 122 and 124 (and the auxiliary rollers 132/152, 134/154, 136/156, and 138/158). The fork 110 provides support and structure for other features and components of the fork assembly 100A.

For ease of description, push/pull rod 106 refers to either a push rod or a pull rod, or a push/pull rod, unless otherwise indicated. The push/pull rod 106 is bar that extends from a rocker arm (not shown) in the chassis to the load wheel assembly 180 to lift the fork 110 and a pallet away from the floor via the extension of the load wheel 182 from the fork 110. The push/pull rod 106 includes a distal end 104 with a hole to rotatably connect a rod pin 107 to the load wheel bracket 186 of the load wheel assembly 180. The rocker arm, push/pull rod 106, and distal end 104 provide part of the lever action on the load wheel assembly 180. A pulling motion (towards the proximal end 112) of the push/pull rod 106 (in a pull rod configuration) may raise the load wheel assembly 180 from the fork 110, while a pushing motion (towards the distal end 114) of the push/pull rod 106 (in a pull rod configuration) may lower the load wheel assembly 180 into the fork 110. Alternatively, a pushing motion (towards the distal end 114) of the push/pull rod (in a push rod configuration, not shown) may raise the load wheel assembly 180 from fork 110, while a pulling motion (towards the proximal end 112) of the push/pull rod (in a push rod configuration, not shown) may lower the load wheel assembly 180 into the fork 110.

The load wheel assembly 180 (or 181 in FIGS. 6A-7B and 10A-11B) includes a load wheel 182, a load wheel bracket 186, and a load wheel axle 184 rotatably coupling the load wheel 182 to the load wheel bracket 186. The load wheel 182 is a wheel or roller that rotates on an axle or axle bearing designed to support the load on the distal end 114 of the fork 110. The load wheel 182 may be wider than other wheels to distribute the weight of the load on the fork 110 over a greater surface area. The load wheel bracket 186 has a forked shape on the distal end to support load wheel axle 184 and a forked shape on the proximal end that includes a pivot hole for a pivot pin 189 and a rod hole for a rod pin 107. These are referred to herein as the load wheel bracket proximal fork 187 and the load wheel bracket proximal fork 188, respectively. The pivot pin 189 is positioned in the pivot hole in the side walls 122 and 124 and the load wheel bracket proximal fork 187 and rotatably connected to the load wheel bracket proximal fork 187. The pivot pin 189 and the rod pin 107 can include a cylindrical feature that may be secured (e.g., via thread) in a hole. The wheel bracket proximal fork 187 of the load wheel bracket 186 and pivot pin 189 provide part of the lever action on the load wheel assembly 180. In a pull rod configuration, the pivot hole is located on the proximal end of the load wheel bracket proximal fork 187 and the rod hole is located between the pivot hole and the coupling that connects the load wheel bracket proximal fork 187 to the load wheel bracket distal fork 188. In a push rod configuration (not shown), the rod hole is located on the proximal end of the load wheel bracket proximal fork 187 and the pivot hole is located between the rod hole and the coupling that connects the load wheel bracket proximal fork 187 to the load wheel bracket distal fork 188.

Alternatively, rather than a push/pull rod running along the length of the fork, the embodiments described herein could utilize a design wherein a hydraulic hose runs along the length of the fork to activate one or more piston-cylinder mechanism near the load wheels to lower and raise the load wheels. Such an alternative design is described in the assignee's U.S. Pat. No. 11,365,103, the entire teachings of which are incorporated herein by reference. Additionally, although the load wheels 182A and 182B of each fork are shown in the drawings as aligned longitudinally, they may be offset so as not to apply a horizontal shunting force to a pallet bottom board simultaneously.

The load wheel assembly 180 may also include a load wheel auxiliary roller 190, load wheel auxiliary roller bracket 194, and load wheel auxiliary roller axle 192 rotatably coupling the load wheel auxiliary roller 190 to the load wheel auxiliary roller bracket 194. The load wheel auxiliary roller 190 has a smaller width or diameter than the load wheel 182. The load wheel auxiliary roller bracket 194 is a forked shape and connected to the coupling of the load wheel bracket 186 that connects the load wheel bracket proximal fork 187 to the load wheel bracket distal fork 188 on the distal side.

An auxiliary roller is a wheel that rotates on an axle or axle bearing and is designed to apply pressure or force on a pallet bottom board 22 when the forks 110 are being inserted or removed from the pallet 20. The material of the auxiliary roller can include metal (e.g., steel or aluminum), polymer (e.g., hard plastic or rubber), or other hard durable material. The material of the axle or axle bearing can include metal (e.g., steel or aluminum) or other hard durable material. In an embodiment, the auxiliary roller has a smaller diameter and width than the load wheel 182. In an embodiment, the auxiliary roller or at least a portion of the auxiliary roller (e.g., a surface or circumference) may use a tacky or sticky material (e.g., rubber) or include a textured or treaded surface so that the auxiliary roller "grabs" the bottom board better or has better friction with the bottom board, which may be better than the friction of the load wheel with the bottom board. The auxiliary rollers includes auxiliary rollers 132/152, 134/154, 136/156, and 138/158, pallet entry rollers (or entry rollers) 162, 164, 166, and 168, and the load wheel auxiliary roller 190. The coupling and placement of the auxiliary roller to the fork 110 and the type or configuration of the auxiliary roller may differ based on location of the auxiliary roller on the fork 110.

One of more of the auxiliary rollers (or exit rollers) 132, 134, 136, and 138 may be referred to as an auxiliary roller assembly (or exit roller assembly) 130. One of more of the auxiliary rollers (or exit rollers) 152, 154, 156, and 158 may be referred to as an auxiliary roller assembly (or exit roller assembly) 150 (FIGS. 5A-5B). The auxiliary rollers 132/152, 134/154, 136/156, and 138/158 are rotatably coupled to the side walls 122 and 124 within the channel of the fork 110 via auxiliary roller axles 142, 144, 146, and 148, respectively. The auxiliary rollers 132/152, 134/154, 136/156, and 138/158 may have a similar structure and material and vary only based on placement or location on the fork 110 or the structure, material, or placement may be different. The auxiliary rollers 132, 134, 136, and 138 of the auxiliary roller assembly 130 are similar to the auxiliary rollers 152, 154, 156, and 158 of the auxiliary roller assembly 150 (FIGS. 5A-5B) but are located on opposite side walls 122 and 124. The auxiliary rollers 132/152, 134/154, 136/156, and 138/158 of the auxiliary roller assembly 130/150 are located between the chassis 102 and the load wheel assembly 180 (or 181 in FIGS. 6A-7B and 10A-11B). Moving from the distal end 114 to the proximal end 112 along the longitudinal axis of the fork 110, the far distal auxiliary roller 132/152 is the auxiliary roller closest to the load wheel assembly 180, then the near distal auxiliary roller 134/154, then the far proximal auxiliary roller 136/156, then the near proximal auxiliary roller 138/158 is the auxiliary roller closest to the chassis 102. The auxiliary rollers 132, 154, 156, and 138 are rotatably connected to the right side wall 122. The auxiliary rollers 152, 134, 136, and 158 are rotatably connected to the left side wall 124. The auxiliary rollers 132/152, 134/154, 136/156, and 138/158 are spaced and offset from each other along the longitudinal axis and configured for bottom boards 22 of a pallet configuration (e.g., bottom board width and spacing 32 and 34) to apply a force on the bottom boards 22, so at least one auxiliary roller or load wheel applies a force on the bottom boards 22 of the pallet 20 when the forks 110 are being inserted or removed from the pallet 20. The near distal auxiliary roller 134/154 and the far proximal auxiliary roller 136/156 on a side wall are closer together than the far distal auxiliary roller 132/152 and the near proximal auxiliary roller 138/158 on the other (or opposite) side wall.

In another embodiment (not shown), some aspects of the design and placement of the auxiliary rollers are aesthetic rather than functional. For example, auxiliary rollers can be rotatably coupled to either side of the side walls 122 and 124 within the channel of the fork 110 or outside the channel of the fork 110. The auxiliary roller location in the direction transverse to the longitudinal fork direction may vary, thus the auxiliary roller may be on the left side or right side of a side wall (e.g., the right side wall 122 or the left side wall 124) of the fork 110 or on one fork 110A (or 110B) rather than another 110B (or 110A) or on both forks 110A and 110B. Furthermore, the width of the auxiliary roller may vary.

The pallet entry roller assembly (or entry roller assembly) 160 is disposed between the load wheel assembly 180 and the tips 118. In an embodiment, the entry roller assembly 160 includes an entry roller bracket 170 that supports four pallet entry rollers (or entry rollers) 162, 164, 166, and 168 on entry rollers axles 172, 174, 176, and 178, respectively. In other configurations (not shown), fewer than four entry rollers are used. For example, an entry roller assembly with three entry rollers may eliminate the first entry roller 162 (and supporting structures and features). The entry roller bracket 170 has an angled, elongated forked shape and may be connected to the top wall 108 of the fork 110 with a weld or fastener 117, such as a screw, bolt, or rivet. Moving from the distal end 114 to the proximal end 112 along the longitudinal axis of the fork 110, the lead entry roller or first entry roller 162 is the exit roller closest to the tips 118, then the second entry roller 164, then the third entry roller 166, then the fourth entry roller 168 is closest to the load wheel assembly 180. The circular areas of the entry rollers 162, 164, 166, and 168 can overlap each other along the transverse axis of the fork 110 but are spaced apart from each other. Two widths of the entry rollers 162, 164, 166, and 168 can fit within the fork of the entry roller bracket 170. In an embodiment, the widths of the entry rollers 162, 164, 166, and 168 are less than half the length of the entry rollers axles 172, 174, 176, and 178 (or the space between the fork of the entry roller bracket 170). For example, the first entry roller 162 and the third entry roller 166 may be on the right side of the entry roller bracket 170 and the second entry roller 164 and the fourth entry roller 168 may be on the left side of the entry roller bracket 170, or vice versa (not shown). The entry rollers 162, 164, 166, and 168 have a vertical displacement from the floor that inclines with an increasing distance from the load wheel 182 of the load wheel assembly 180 towards the distal end 114. So a graduated incremental change in distance occurs with each entry roller 162, 164, 166, and 168, which reduces a horizontal force on the pallet 20. Stated differently, the entry rollers 162, 164, 166, and 168 have a vertical displacement from the floor that declines with a decreasing distance from the distal end 114 towards the load wheel 182 of the load wheel assembly 180. The lead entry roller 162 is designed to have a vertical distance from the floor greater than or approximately the same as the width of the bottom boards 22 of the pallet 20 (or the distance of the bottom boards 22 from the floor). Thus in an embodiment, a downward force is applied on the front bottom board 22A by at least one of the entry rollers 162, 164, 166, and 168 before substantial horizontal force is applied by the entry rollers 162, 164, 166, and 168 or load wheel 182.

FIGS. 5A and 5B are views of a pallet truck with a fork assembly 100B with elongated forks 110; auxiliary rollers 152, 154, 156, and 158; pallet entry rollers 162, 164, 166, and 168; and a load wheel auxiliary roller 190 according to one embodiment. FIG. 5A is a right-side section view and FIG. 5B is a bottom view. The fork assembly 100B is similar to the fork assembly 100A (FIGS. 3A-3B) with auxiliary rollers 152, 154, 156, and 158 placed on a different side wall 122 and 124 from auxiliary rollers 132, 134, 136, and 138 (FIGS. 3A-3B). The auxiliary rollers 154 and 156 are rotatably connected to the right side wall 122. The auxiliary rollers 152 and 158 are rotatably connected to the left side wall 124.

In another embodiment, the auxiliary roller assembly 150, including the auxiliary rollers 152, 154, 156, and 158 (as shown in FIGS. 5A-5B) can be added to the fork assembly 100A (FIGS. 3A-3B) with the auxiliary roller assembly 130, including the auxiliary rollers 132, 134, 136, and 138, so eight auxiliary rollers are rotatably connected to each fork 110. FIGS. 12A-13I illustrates an auxiliary roller assembly with eight auxiliary rollers, six of which are shown as optional.

FIGS. 6A and 6B are views of a pallet truck with a fork assembly 100C with elongated forks 110; auxiliary rollers 132, 134, 136, and 138; and pallet entry rollers 162, 164, 166, and 168 according to one embodiment. FIG. 6A is a right-side section view and FIG. 6B is a bottom view. The fork assembly 100C is similar to the fork assembly 100A (FIGS. 3A-3B) but has a load wheel assembly 181 without the load wheel auxiliary roller 190, the load wheel auxiliary roller axle 192, or the load wheel auxiliary roller bracket 194.

FIGS. 7A and 7B are views of a pallet truck with a fork assembly 100D with elongated forks 110; auxiliary rollers 152, 154, 156, and 158; and pallet entry rollers 162, 164, 166, and 168 according to one embodiment. FIG. 7A is a right-side section view and FIG. 7B is a bottom view. The fork assembly 100D is similar to the fork assembly 100B (FIGS. 5A-5B) but the load wheel assembly 181 lacks the load wheel auxiliary roller 190, the load wheel auxiliary roller axle 192, the load wheel auxiliary roller bracket 194.

In another embodiment, the auxiliary roller assembly 150, including the auxiliary rollers 152, 154, 156, and 158 (as shown in FIGS. 7A-7B) can be added to the fork assembly 100C (FIGS. 6A-6B) with the auxiliary roller assembly 130, including the auxiliary rollers 132, 134, 136, and 138, so eight auxiliary rollers are rotatably connected to each fork 110.

FIGS. 8A and 8B are views of a pallet truck with a fork assembly 100E with elongated forks 110; auxiliary rollers 132, 134, 136, and 138; and the load wheel auxiliary roller 190 according to one embodiment. FIG. 8A is a right-side section view and FIG. 8B is a bottom view. The fork assembly 100E is similar to the fork assembly 100A (FIGS. 3A-3B) but without the entry roller assembly 160.

FIGS. 9A and 9B are views of a pallet truck with a fork assembly 100F with elongated forks 110; auxiliary rollers 152, 154, 156, and 158 and the load wheel auxiliary roller 190 according to one embodiment. FIG. 9A is a right-side section view and FIG. 9B is a bottom view. The fork assembly 100F is similar to the fork assembly 100B (FIGS. 5A-5B) but without the entry roller assembly 160.

In another embodiment, the auxiliary roller assembly 150, including the auxiliary rollers 152, 154, 156, and 158 (as shown in FIGS. 9A-9B) can be added to the fork assembly 100E (FIGS. 8A-8B) with the auxiliary roller assembly 130, including the auxiliary rollers 132, 134, 136, and 138, so eight auxiliary rollers are rotatably connected to each fork 110.

FIGS. 10A and 10B are views of a pallet truck with a fork assembly 100G with elongated forks 110 and auxiliary rollers 132A, 134B, 136B, and 138A according to one embodiment. FIG. 10A is a right-side section view and FIG. 10B is a bottom view. The fork assembly 100G is similar to the fork assembly 100A (FIGS. 3A-3B) but without auxiliary rollers 132B, 134A, 136A, and 138B, without the entry roller assembly 160, and without the load wheel auxiliary roller 190, the load wheel auxiliary roller axle 192, or the load wheel auxiliary roller bracket 194 on the load wheel assembly 181. The fork assembly 100A includes eight auxiliary rollers 132, 134, 136, and 138 (four for each fork 110) while the fork assembly 100G includes four auxiliary rollers 132A, 134B, 136B, and 138A (two for each fork 110). The two auxiliary rollers 132A and 138A (or 134B and 136B) on a first elongate fork are offset from the two auxiliary rollers on a second elongate fork along the longitudinal axis 134B and 136B (or 132A and 138A).

FIGS. 11A and 11B are views of a pallet truck with a fork assembly 100H with elongated forks 110 and auxiliary rollers 152A, 154B, 156B, and 158A according to one embodiment. FIG. 11A is a right-side view and FIG. 11B is a bottom section view. The fork assembly 100H is similar to the fork assembly 100B (FIGS. 5A-5B) but without auxiliary rollers 152B, 154A, 156A, and 158B; without the entry roller assembly 160, and without the load wheel auxiliary roller 190, the load wheel auxiliary roller axle 192, or the load wheel auxiliary roller bracket 194 on the load wheel assembly 181. The fork assembly 100B includes eight auxiliary rollers 152, 154, 156, and 158 (four for each fork 110) while the fork assembly 100H includes four auxiliary rollers 152A, 154B, 156B, and 158A (two for each fork 110). The two auxiliary rollers 152A and 158A (or 154B and 156B) on a first elongate fork are offset from the two auxiliary rollers on a second elongate fork along the longitudinal axis 154B and 156B (or 152A and 158A). The fork assemblies 100G and 100H may provide similar functionality as other fork assemblies 100A-100F described but with fewer auxiliary rollers.

In another embodiment, any of the auxiliary rollers 132, 134, 136, and 138 (as shown in FIGS. 5A-5B) and any of the auxiliary rollers 152, 154, 156, and 158 (as shown in FIGS. 3A-3B) can be selectively added to the fork assembly 100G (FIGS. 10A-10B) so three to eight auxiliary rollers are rotatably connected to each fork 110.

Fork Assembly Design

FIGS. 12A-12I and 13A-13I illustrate designs for a fork assembly of a pallet truck, as shown and described. FIGS. 12A-12I is a design of elongated forks and auxiliary rollers with optional features. FIGS. 13A-13I is another design of elongated forks and auxiliary rollers with optional features. Some lines and shading shown throughout the views are intended to indicate surface contour. The broken lines in the drawings are for the purpose of illustrating portions of the fork assembly or the pallet truck that form no part of the design.

Fork Assembly Configurations

Figure 14A:
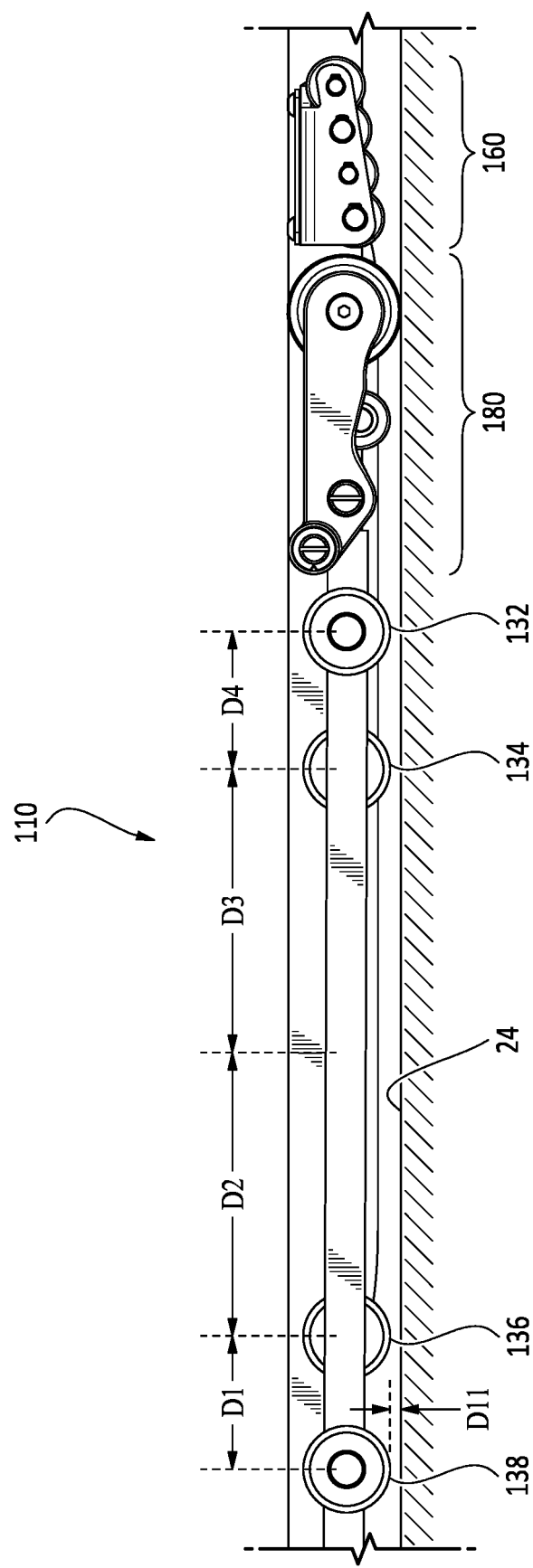

FIGS. 14A-14C are side section views of a fork assembly 100A with elongated forks 110; auxiliary rollers 132, 134, 136, and 138; pallet entry rollers 162, 164, 166, and 168; and a load wheel auxiliary roller 190 with dimensions in the configuration of FIG. 3B. The same dimensions may apply to the fork assemblies 100A-100H. The dimensions may be selected for a particular pallet configuration or type (or similar pallet configurations or types with bottom boards 22 with similar height, width, and spacing 32 and 34) so a downward force is applied on at least one bottom board 22 for the pallet 20 by at least one of the auxiliary rollers (or load wheel 182) before or while substantial horizontal force is applied by the load wheel 182.

D1-D10 are dimensions along the longitudinal axis of the fork 110. D11-D20 are vertical dimensions from a supporting surface 24, such as the floor, with the load wheel 182 in a lowered or closed position. In an example, the dimensions may have manufacturing or design tolerances. For example, the nominal or stated horizontal dimensions may have tolerance or range plus or minus (±) 5.0 mm. The nominal or stated vertical dimensions may have tolerance or range±2.0 mm. D1 is the distance from a center of the near proximal auxiliary roller 138 to a center of the far proximal auxiliary roller 136. D2 is the distance from the center of the far proximal auxiliary roller 136 to a midpoint between the far proximal auxiliary roller 136 and the near distal auxiliary roller 134. D3 is the distance from a center of the near distal auxiliary roller 134 to the midpoint between the far proximal auxiliary roller 136 and the near distal auxiliary roller 134. D2+D3 is the distance from the center of the far proximal auxiliary roller 136 to the center of the near distal auxiliary roller 134. D4 is the distance from the center of the near distal auxiliary roller 134 to a center of the far distal auxiliary roller 132.

Referring to FIG. 14C, D5 is the distance from the center of the far distal auxiliary roller 132 to a center of the pivot pin 189. D6 is the distance from the center of the pivot pin 189 to a center of the load wheel auxiliary roller 190. D7 is the distance from the center of the pivot pin 189 to a center of the fourth entry roller 168. D8 is the distance from the center of the fourth entry roller 168 to a center of the third entry roller 166. D9 is the distance from the center of the third entry roller 166 to a center of the second entry roller 164. D10 is the distance from the center of the second entry roller 166 to a center of the first entry roller 164.

Referring to FIGS. 14A and 14B, D11, D12, and D13 are the distances from a bottom of the auxiliary rollers 132, 134, 136, and 138 to the floor 24. In an embodiment, D11, D12, and D13 may be less than the thickness of the bottom board 22 so a force can be applied to the bottom board 22. D14 is the distance from a bottom of the load wheel auxiliary roller 190 to the floor 24. D15 is the distance from a bottom of the side wall flange 125 on the side walls 122 and 124 to the floor 24. D16 is the distance from a top of the fork 110 to the floor 24 with the load wheel 182 in a lowered or closed position. D17 is the distance from a bottom of the fourth entry roller 168 to the floor 24. D18 is the distance from a bottom of the third entry roller 166 to the floor 24. D19 is the distance from a bottom of the second entry roller 166 to the floor 24. D20 is the distance from a bottom of the first entry roller 164 to the floor 24.

The dimensions for the fork assemblies 100A-100H may vary based on the configuration or type of pallet 20 primarily used with the pallet truck 10. For example, for a pallet truck 10 and fork assembly 100 designed for the Australian CHEP 10001 pallet 20C configuration, D1 may be 100 mm, D2 may be 212.5 mm, D3 may be 212.5 mm, D2+D3 may be 425 mm, D4 may be 103 mm, D5 may be 62 mm for pull rod configuration (or 97 mm for a push configuration), D6 may be 97 mm for pull rod configuration (or 0 mm for a push configuration), D7 may be 248 mm for pull rod configuration (or 213 mm for a push configuration), D8 may be 33 mm, D9 may be 33 mm, and D10 may be 33 mm. D11, D12, and D13 may be 8.5 mm, D14 may be 7.5 mm, D15 may be 17.5 mm, D16 may be 84.5 mm, D17 may be 7.9 mm, D18 may be 12.7 mm, D19 may be 17.5 mm, and D20 may be 22.3 mm. The dimensions may be different for pallet truck used primarily with the North American GMA stringer pallet 20D, the Standard European pallet, or other type of closed pallet.

Fork Assembly Insertion and Removal from In-Line Pallets Use Case

FIGS. 15A-15P are right side section views of the elongated fork 110 entering two in-line pallets 20A-20B according to one embodiment. FIGS. 15A-15P illustrate a downward force being applied on at least one bottom board 22 for each pallet 20A-20B by at least one of the auxiliary rollers (or load wheel 182) while the load wheel 182 is passing through primary entry and exit pallet pockets 30A. The downward force being applied on at least one bottom board 22 may occur before or while a substantial horizontal force is applied by the load wheel 182 to the at least one bottom board 22. Pallet component references are made to the Australian CHEP 10001 pallet 20C, but the process and features may also apply to other pallet configurations as well (e.g., North American GMA stringer pallet 20D). Sequencing FIGS. 15A-15P in reverse order illustrates the elongated forks being removed from two in-line pallets 20A-20B. FIGS. 15A-15M refers to the features of the first pallet (or proximal pallet) 20A (e.g., bottom boards 22A-22E). FIGS. 15N-15P refers to the features of both the first pallet (or proximal pallet) 20A and the second pallet (or distal pallet) 20B (e.g., bottom boards 22A-22E).

FIG. 15A illustrates the lead entry roller 162 of the entry roller assembly 160 of the fork 110 contacting the top corner of the front bottom board 22A applying minimal to no horizontal force on the front bottom board 22A. FIG. 15B illustrates the load wheel 182 of the load wheel assembly 180 contacting the top corner of the front bottom board 22A applying a minimal horizontal force on the front bottom board 22A while the fourth entry roller 168 is applying a downward vertical force on the front bottom board 22A, which keeps the pallet 20A substantially stationary. The entry rollers 162, 164, 166, and 168 sequentially and incrementally raise the forks 110 and the load wheel 182 so the contact with the front bottom board 22A imparts less horizontal motion than without the entry roller assembly 160. FIG. 15C illustrates the load wheel 182 applying a downward vertical force on the front bottom board 22A, which keeps the pallet 20A substantially stationary. FIG. 15D illustrates the load wheel 182 dropping into a large bottom board space 32 and the load wheel auxiliary roller 190 applying a downward vertical force on the front bottom board 22A, which continues to keep the pallet 20A substantially stationary.

FIG. 15E illustrates the far distal auxiliary roller 132 contacting the front bottom board 22A as the load wheel auxiliary roller 190 is dropping into a large bottom board space 32 applying a continual downward vertical force on the front bottom board 22A, which keeps the pallet 20A substantially stationary. FIG. 15F illustrates the near distal auxiliary roller 134 contacting the front bottom board 22A while the far distal auxiliary roller 132 is still applying a continual downward vertical force on the front bottom board 22A before the load wheel 182 contacts the middle bottom board 22C, which keeps the pallet 20A substantially stationary. FIG. 15G illustrates the load wheel 182 applying a downward vertical force on the middle bottom board 22C (with some auxiliary roller raised slightly from the bottom boards 22), which keeps the pallet 20A substantially stationary. FIG. 15H illustrates the load wheel auxiliary roller 190 applying a downward vertical force on the middle bottom board 22C before the load wheel 182 contacts the middle bottom board 22D, which keeps the pallet 20A substantially stationary.

FIG. 15I illustrates the load wheel 182 applying a downward vertical force on the middle bottom board 22D (with some auxiliary roller raised slightly from the bottom boards 22), which keeps the pallet 20A substantially stationary. FIG. 15J illustrates the load wheel auxiliary roller 190 applying a downward vertical force on the middle bottom board 22D and the far distal auxiliary roller 132 applying a downward vertical force on the middle bottom board 22C before the load wheel 182 contacts the middle bottom board 22E, which keeps the pallet 20A substantially stationary.

FIG. 15K illustrates the load wheel 182 applying a downward vertical force on the middle bottom board 22E and the far proximal auxiliary roller 136 applying a downward vertical force on the front bottom board 22A, which keeps the pallet 20A substantially stationary. FIG. 15L illustrates the near distal auxiliary roller 134 applying a downward vertical force on the middle bottom board 22D and the far proximal auxiliary roller 136 and the near proximal auxiliary roller 138 applying a downward vertical force on the front bottom board 22A, which keeps the pallet 20A substantially stationary. FIG. 15M illustrates the near proximal auxiliary roller 138 applying a downward vertical force on the front bottom board 22A when the load wheel 182 contacts the rear bottom board 22B, which keeps the pallet 20A substantially stationary. The fourth entry roller 168 applies a downward vertical force on the rear bottom board 22B before the load wheel 182 contacts the rear bottom board 22B.

FIG. 15N illustrates the load wheel 182 applying a downward vertical force on the front bottom board 22A (of the second pallet 20B) and the far proximal auxiliary roller 136 applying a downward vertical force on the middle bottom board 22D (of the first pallet 20A) and the near proximal auxiliary roller 138 applying a downward vertical force on the middle bottom board 22C (of the first pallet 20A), which keeps both pallets 20A and 20B substantially stationary. FIG. 15O illustrates the load wheel 182 dropping into a large bottom board space 32 (of the second pallet 20B) and the load wheel auxiliary roller 190 applying a downward vertical force on the front bottom board 22A (of the second pallet 20B). At the same time, the far distal auxiliary roller 132 and the near distal auxiliary roller 134 applies a downward vertical force on the rear bottom board 22B (of the first pallet 20A) and the far proximal auxiliary roller 136 applies a downward vertical force on the middle bottom board 22D (of the first pallet 20A), which keeps both pallets 20A and 20B substantially stationary. FIG. 15P illustrates the elongated fork 110 fully inserted into both pallets 20A and 20B. The load wheel 182 is placed into the large bottom board space 32 (of the second pallet 20B) between the front bottom board 22A and the middle bottom board 22C, which is typically the load wheel 182 position to lift two in-line pallets 20A-20B. The far distal auxiliary roller 132 applies a downward vertical force on the front bottom board 22A (of the second pallet 20B), the near distal auxiliary roller 134 applies a downward vertical force on the rear bottom board 22B (of the first pallet 20A), the far proximal auxiliary roller 136 applies a downward vertical force on the middle bottom board 22E (of the first pallet 20A), and the near proximal auxiliary roller 138 applies a downward vertical force on the middle bottom board 22D (of the first pallet 20A). As shown in FIGS. 15A-15P, for each position of the fork 110 in the fork assembly 100 passing through primary entry and exit pallet pockets 30A, at least one auxiliary roller (or load wheel 182) applies a downward force on at least one bottom board 22 for each pallet 20A-20B. When the fork 110 is lifted by the load wheel moving away from the fork 110, the auxiliary rollers are also lifted from the bottom boards 22.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence, paragraph, or drawing can be combined with subject matter of some or all of the other sentences, paragraphs, or drawings, except where such combinations are mutually exclusive. The scope of the invention should therefore be determined only by the following claims, claims presented in a continuing patent application or a post-issuance proceeding, and equivalents to such claims.

The invention claimed is:

1. A fork assembly for a forked materials-handling vehicle with a chassis, the fork assembly being configured to simultaneously lift at least two inline pallets, each pallet comprising a plurality of bottom boards, the fork assembly comprising:
 a plurality of elongated forks, including a first fork and a second fork, wherein each fork has a proximal end and a distal end along a longitudinal axis, wherein the proximal end of each fork is attached to the chassis, wherein each fork includes a load wheel connected to the fork, and wherein each fork has a length sufficient to lift at least two pallets arranged in an inline configuration; and
 a plurality of auxiliary rollers rotatably coupled to one or more of the plurality of forks, wherein the plurality of auxiliary rollers are positioned longitudinally along the length of the fork assembly such that at least one of the auxiliary rollers is on at least one bottom board of a proximal pallet of the at least two pallets when the load wheel has entered the proximal pallet and contacts a bottom board of the at least two pallets.

2. A fork assembly according to claim 1, wherein at least one of the auxiliary rollers is on at least one bottom board of each of the at least two pallets when the load wheel has entered a distal pallet of the at least two pallets and contacts a bottom board of the distal pallet.

3. A fork assembly according to claim 1, wherein each fork further comprises at least two auxiliary rollers rotatably coupled to side walls of the fork and positioned between the load wheel and the chassis, wherein the two auxiliary rollers rotatably coupled to a first side wall of one of the plurality of forks are closer together than another two auxiliary rollers rotatably coupled to a second side wall of one of the plurality of forks.

4. A fork assembly according to claim 1, wherein each fork further comprises four auxiliary rollers positioned between the load wheel and the chassis, wherein two auxiliary rollers rotatably coupled to a first side wall of the fork are closer together than another two auxiliary rollers rotatably coupled to a second side wall of the fork.

5. A fork assembly according to claim 4, wherein each fork further comprises a pull rod or a push rod positioned between the auxiliary rollers rotatably coupled to the first side wall of the fork and the auxiliary rollers rotatably coupled to the second side wall of the fork, wherein a movement of the pull rod or push rod raises the fork away from or lowers the fork into the load wheel.

6. A fork assembly according to claim 1, wherein each fork further comprises eight auxiliary rollers positioned between the load wheel and the chassis, wherein four auxiliary rollers are rotatably coupled to a first side wall of the fork and four auxiliary rollers are rotatably coupled to a second side wall of the fork.

7. A fork assembly according to claim 1, wherein each auxiliary roller rotates on a separate auxiliary roller axle.

8. A fork assembly according to claim 1, wherein each fork further comprises an entry roller assembly with four entry rollers operatively connected between the load wheel and the distal end, wherein with each entry roller from the load wheel towards the distal end, the entry rollers incline with an increasing distance from a supporting surface.

9. A fork assembly according to claim 8, wherein a lead entry roller of the four entry rollers of the entry roller assembly is positioned at least a pallet bottom board width higher than the bottom of the load wheel.

10. A fork assembly according to claim 8, wherein the four entry rollers of the entry roller assembly are supported by an entry roller bracket connected to the fork.

11. A fork assembly according to claim 10, wherein each of four entry rollers rotates on an entry roller axle and a width of at least one of four entry rollers is less than half the length of its entry roller axle.

12. A fork assembly according to claim 10, wherein circular areas of at least two of four entry rollers overlap each other along a transverse axis of the fork.

13. A fork assembly according to claim 1, wherein a length of each fork is at least 2000 millimeters (mm) from the chassis.

14. A fork assembly according to claim 1, wherein a bottom of at least one of the auxiliary rollers of each fork is positioned less than a pallet bottom board width higher than the load wheel in a retracted position.

15. A fork assembly according to claim 1, wherein the load wheel assembly includes a load wheel bracket rotatably coupled with the fork configured to lift and lower the fork from a supporting surface via the load wheel, wherein the load wheel is rotatably coupled with the load wheel bracket.

16. A fork assembly according to claim 15, wherein the load wheel bracket supports a load wheel auxiliary roller rotatably coupled with the load wheel bracket.

17. A fork assembly according to claim 16, wherein a bottom of the load wheel auxiliary roller is positioned less than a pallet bottom board width higher than the load wheel.

18. A forked materials-handling vehicle comprising:
 a chassis;
 a plurality of elongated forks, including a first fork and a second fork, wherein each fork has a proximal end and a distal end along a longitudinal axis, wherein the proximal end of each fork is attached to the chassis, wherein each fork includes a load wheel connected to the fork, and wherein each fork has a length sufficient to lift at least two pallets arranged in an inline configuration; and
 a plurality of auxiliary rollers rotatably coupled to one or more of the plurality of elongated forks, wherein the plurality of auxiliary rollers are positioned longitudinally along the length of the fork such that at least one of the auxiliary rollers is on at least one bottom board of a proximal pallet of the at least two pallets when the load wheel has entered the proximal pallet and contacts a bottom board of the at least two pallets.

19. A forked materials-handling vehicle according to claim 18, wherein at least one of the auxiliary rollers is on at least one bottom board of each of the at least two pallets when the load wheel has entered a distal pallet of the at least two pallets and contacts a bottom board of the distal pallet.

20. A forked materials-handling vehicle according to claim 18, wherein each fork further comprises at least two auxiliary rollers positioned between the load wheel and the chassis, wherein the two auxiliary rollers rotatably coupled to a first side wall of one of the plurality of forks are between the other two exit rollers rotatably coupled to a second side wall of one of the plurality of forks along the longitudinal axis.

21. A forked materials-handling vehicle according to claim 18, wherein the forked materials-handling vehicle is a pallet truck.

22. A fork for a forked materials-handling vehicle with a chassis, the fork being configured to simultaneously lift at least two inline pallets, each pallet comprising a plurality of bottom boards, the fork comprising:
- a proximal end and a distal end along a longitudinal axis, wherein the proximal end is attached to the chassis, wherein the fork includes a load wheel connected to the fork, and wherein the fork has a length sufficient to lift at least two pallets arranged in an inline configuration; and
- a plurality of auxiliary rollers rotatably coupled to the fork, wherein the plurality of auxiliary rollers are positioned longitudinally along the length of the fork such that at least one of the auxiliary rollers is on at least one bottom board of a proximal pallet of the at least two pallets when the load wheel has entered the proximal pallet and contacts a bottom board of the at least two pallets.

* * * * *